(12) United States Patent
Buchko et al.

(10) Patent No.: US 7,859,992 B2
(45) Date of Patent: Dec. 28, 2010

(54) ROUTER REDUNDANCY IN DATA COMMUNICATION NETWORKS

(75) Inventors: Steven Buchko, Dunrobin (CA); Shawn McAllister, Manotick (CA)

(73) Assignee: Solace Systems, Inc., Ottawa, ON (CA)

( * ) Notice: Subject to any disclaimer, the term of this patent is extended or adjusted under 35 U.S.C. 154(b) by 702 days.

(21) Appl. No.: 11/425,777

(22) Filed: Jun. 22, 2006

(65) Prior Publication Data
US 2007/0008880 A1 Jan. 11, 2007

Related U.S. Application Data

(60) Provisional application No. 60/696,790, filed on Jul. 7, 2005.

(51) Int. Cl.
*G01R 31/08* (2006.01)

(52) U.S. Cl. .......... 370/217; 370/216; 370/218; 370/219; 370/220; 370/221; 370/229; 379/279; 709/235; 709/236; 709/237; 709/238; 709/239; 714/3; 714/4; 714/5

(58) Field of Classification Search ......... 709/235–239; 370/229; 379/279
See application file for complete search history.

(56) References Cited

U.S. PATENT DOCUMENTS

| | | | | |
|---|---|---|---|---|
| 5,473,599 | A * | 12/1995 | Li et al. ............ | 370/219 |
| 7,152,179 | B1 * | 12/2006 | Critchfield ......... | 714/4 |
| 7,486,698 | B2 * | 2/2009 | Betts et al. ......... | 370/469 |
| 7,586,838 | B2 * | 9/2009 | Sonoda ............. | 370/216 |

(Continued)

FOREIGN PATENT DOCUMENTS

EP 1 594 264 11/2005

(Continued)

OTHER PUBLICATIONS

Hinden/Nokia R. "Virtual Router Redundancy Protocol for IPv6; draft-ietf-vrrp-ipv6-spec-07. txt;"IETF Standard-Working-Draft, Internet Engineering Task Force, IETF, CH, vol. vrrp No. 7 Sep. 28, 2004 XP015039135 ISSN: 0000-004 Para. 3, 4.1, 4.2, 5.0, 5.2.1, 5.3.3, 6.1, 6.4.3.

(Continued)

*Primary Examiner*—Daniel J Ryman
*Assistant Examiner*—Aixa A Guadalupe
(74) *Attorney, Agent, or Firm*—Marks & Clerk; Richard J. Mitchell

(57) ABSTRACT

A method of providing router redundancy within a distributed network of routers, wherein messages are routed within the network based on virtual router identifiers, involves organizing the routers into one or more redundancy groups; assigning a physical identifier to each router in each of the redundancy groups; assigning one or more virtual identifiers to each redundancy group; selecting one of the routers of a particular redundancy group as a currently active router associated with a particular virtual identifier assigned to that redundancy group; advertising among the distributed network of routers for each redundancy group the physical identifier for the active router and information enabling other routers to determine the virtual identifier with which the currently active router is associated; and forwarding messages destined for a particular virtual router identifier to the currently active router based on the physical identifier of the currently active router.

31 Claims, 8 Drawing Sheets

U.S. PATENT DOCUMENTS

2004/0085965 A1* 5/2004 Fotedar ................. 370/395.31
2005/0137998 A1* 6/2005 Betts et al. ..................... 707/1

FOREIGN PATENT DOCUMENTS

WO     WO 2004/028102     4/2004

OTHER PUBLICATIONS

Carzaniga A et al: "A routing scheme for content-based networking" INFOCOM 2004. Twenty-Third Annual Joint Conference of the IEEE Computer and Communications Societies, Hong Kong, PR China Mar. 7-11, 2004, Piscataway, N.J. USA, IEEEE vol. 2, Mar. 7, 2004, pp. 918-928 XP010740838 ISBN: 0-7803-8355-9.

* cited by examiner

ROUTER REDUNDANCY IN DATA COMMUNICATION NETWORKS

CROSS REFERENCE TO RELATED APPLICATION

This invention claims the benefit under 35 USC 119(e) of prior U.S. application No. 60/696,790, filed Jul. 7, 2005, the contents of which are herein incorporated by reference.

FIELD OF THE INVENTION

This invention relates to data communication networks and in particular to a method of providing router redundancy in data communication networks, particularly but not exclusively content-routed networks.

BACKGROUND OF THE INVENTION

Content-based networks are described in A Carzaniga, M. J. Rutherford, A. L. Wolf, A routing scheme for content-based networking, Department of Computer Science, University of Colorado, June 2003, the contents of which are incorporated herein by reference.

In content routed networks, a publish/subscribe data communication is provided wherein publishers can inject content into the network, and subscribers can subscribe to content from the network. The publishers and subscribers do not require knowledge of each other.

FIG. 1 depicts an example content-routed network 1, which consists of a plurality of content routers 2, 3, 4, and 5 interconnected by links 11, 12, 15 and 16; a publisher 6 (note that a content routed network typically will have a plurality of publishers but only one is shown in FIG. 1); a plurality of subscribers 7, 8, 9 and 17 (note that a content routed network can contain a large number of subscribers, i.e. millions). A publisher is a computer or user that can insert content into the network. A subscriber is a computer or user who has expressed interest in some specific content. Publisher 6 publishes a message into the content routed network by sending it over link 10 to content router 2. The term "message" is used throughout, and is intended meant to cover any type of content that can be sent to a subscriber over a network. Such content would include, for example, multimedia files.

Content router 2 matches the content of the received message against the subscriptions for the network, which the router learned of through a content routing protocol described in our copending U.S. patent application Ser. No. 11/012,113, the contents of which are incorporated herein by reference) or by some other means. Content router 2 determines that the message is required by a local subscriber on content router 2, and one or more subscribers on content router 3 and content router 4, but not by any subscribers on content router 5. As a result, a single copy of the message is sent over link 11 to content router 3, since link 11 is the preferred path to content routers 3 and 4 in this example. In addition, a copy of the message is sent over link 18 to local subscriber 17. Content router 3 delivers the message to all local subscribers which have matching subscriptions, which in this case is subscriber 7. So, a copy of the message is sent over link 13 to subscriber 7. In addition, the message is forwarded on to content router 4 over link 12. In a similar manner, content router 4 delivers the message to any local subscribers with matching subscriptions, which in this case is subscriber 8. Thus, the message is sent over link 14 to subscriber 8. Content router 4 also determines that no further content routers require a copy of the message. Full details of the content routing protocol used are disclosed in U.S. patent application Ser. No. 11/012,113 referred to above.

A content-routed network must be able to continue to provide service in the face of failures inevitable that are inevitable in complex networks. Failures can be due to hardware or software failures in the content routers 2, 3, 4, 5, or due to failures in the communications links 11, 12, 15, 16 that interconnect the content routers, as well as failures in the communications network between a content router and publishers and subscribers. Note that a communication link such as 11 may be a point-to-point physical link, or may be a logical connection such as a TCP connection over an underlying network such as an IP or MPLS network.

A content-routing protocol, such as disclosed in U.S. patent application Ser. No. 11/012,113 can re-route around failures in communication links and content routers, as long as an alternate path is available through the content-routed network. For example, if link 11 fails or content router 3 fails, content router 2 can still reach content router 4 over links 15 and 16, via content router 5. However, if a content router such as 2 fails, the attached publishers (such as 6) and subscribers (such as 17) will no longer receive service unless the content-routed network has capabilities to deal with such a failure.

For layer 2 and layer 3 networks, techniques exist for providing router redundancy for attached hosts, as disclosed in U.S. Pat. No. 5,473,599, the contents of which are incorporated herein by reference. A similar technique is described in RFC 3768, "Virtual Router Redundancy Protocol (VRRP)", April 2004, The Internet Society, the contents of which are incorporated herein by reference. With these techniques, the concept of a virtual router is introduced, and two more physical routers are available to act on behalf of a virtual router. When a physical router is providing service on behalf of a virtual router, and the physical router fails, the protocol allows for another physical router to detect the failure and take over service for the virtual router. Attached hosts only need to address the virtual router, and so do not have to participate in the router redundancy protocol or to have any configuration changes as a result of the failure of a physical router that is providing service.

VRRP requires that the pool of routers participating in the redundancy scheme for a given virtual router share a common interface to reach the hosts which are served. Referring to FIG. 2, in IP network 29, IP routers 30 and 31 are participating in VRRP (shown by grouping 41), and are connected to a common local area network (LAN) 37. Attached to LAN 37 are hosts 33, 34, 35, and 36. On interface 38, router 30 has an address "IP A". On interface 39, router 31 has an address "IP B". Hosts 33 and 34 are configured to have a default gateway address of "IP A", while hosts 35 and 36 are configured to have a default gateway address of "IP B". Thus, when both routers 30 and 31 are functioning, any traffic sent from hosts 33 or 34 outside of the LAN 37 will be directed via router 30, while any traffic sent by hosts 35 or 36 outside of LAN 37 will be directed via router 31. However, if router 30 fails, router 31 takes over the address "IP A" on LAN 37, and issues an Address Resolution Protocol (ARP) packet to automatically refresh the binding of "IP A" in the ARP caches of any hosts on LAN 37. Thus hosts 33 and 34 will automatically send any traffic destined outside of LAN 37 via router 31. For further details, refer to the references noted above.

A key aspect of VRRP is that the routing protocols operating among routers 30, 31 and 32 in the IP network are not affected by the existence of VRRP. Since routers 30 and 31 are connected to a common LAN 37, both advertise the same IP address prefix that summarizes all reachable hosts on LAN 37. Thus, when host 36 wishes to communicate to a host on LAN 37, router 32 only needs to know that both routers 30 and 31 can reach an address on LAN 37. Router 32 can choose to reach a given host via router 30 or 31, independently of which router a host on LAN 37 is using as its current gateway. This is enabled by the common connectivity of routers 30 and 31 to LAN 37. When a router such as 30 fails, the routing protocol involved can quickly converge on the new route to reach LAN 37.

Redundancy techniques such as that offered by VRRP can also be applied to content-routed networks; however, it is not sufficient due to the complexity involved in routing based on the content of documents or messages as opposed to simply routing based on destination addresses as is done in IP networks or the like. Instead, a content-router has to advertise a very large and complex covering set to indicate a summary of the interests of all attached subscribers, as disclosed in U.S. patent application Ser. No. 11/012,113.

Referring to FIG. 3, in content-routed network 49, content routers 50 and 51 can be part of a redundancy grouping 61. Routers 50 and 51 have a connection to a common LAN 57. Router 50 connects to LAN 57 via interface 58 with an address of "IP A". Router 51 connects to LAN 57 via interface 59 with an address of "IP B". Subscriber 53 and subscriber 54 are provisioned to connect to a content router with an address of "IP A", while subscribers 55, 56 and publisher 62 are provisioned to connect to a content router with an address of "IP B". Note that with content routing, a publisher publishes documents or messages to an assigned content router, and is not concerned with which subscribers in the network will receive published documents or messages. Similarly, subscribers indicate to their assigned content router what their interests are (through content-based subscriptions), and do not have to know where in the network the content is being originated from. Subscribers and publishers typically connect to a content router using a protocol such as TCP, although many such protocols can be utilized.

As disclosed in U.S. patent application Ser. No. 11/012, 113, the content-routing protocol in network 49 distributes covering sets of subscriptions among the content routers, enabling a content router to know where it needs to route a given message based on the interests of subscribers in the network. Thus, router 50 can compute and publish a covering set which summarizes the subscriptions of all its connected subscribers, and router 51 and router 52 can do the same. If router 50 fails, techniques such as those offered with VRRP can be utilized to allow router 51 to take over the address "IP A", and ARP can be used to re-bind "IP A" to interface 59 of router 51. Any active TCP connections to "IP A" will fail, and when the TCP connections are re-established, they will now be made to router 51 instead of router 50. Thus, the techniques of VRRP can hide the details of router redundancy from attached subscribers and publishers on LAN 57. It should be noted, however, that a change in behavior is needed from the standard VRRP behavior. VRRP specifies that when a router takes over an IP address from another router, it cannot terminate any traffic addressed to that IP address. However, in content-routed networks, when a content-router takes over an interface IP address from another content-router, it must terminate traffic sent to that IP address since subscribers and publishers are actually communicating directly with the content-router, as opposed to using it just as a gateway as in the case of IP routing.

Looking at router 52, it sees a different covering set from content router 50 and from content router 51, since content router 50 is advertising a summary of the subscriptions from subscribers 53 and 54, while content router 51 is advertising a summary of the subscriptions from subscribers 55 and 56. Note that in reality there can be tens of thousands of subscribers off of a single content router. Thus, unlike in the scenario of an IP network described above, with content-routing the use of VRRP alone does not solve the redundancy problem. When content router 50 fails, content router 52 must learn that content router 51 now requires a different set of documents or messages to be routed to it that now satisfies the needs of subscribes 53, 54, 55 and 56, instead of just 55 and 56.

One possible inventive solution to the above problem not forming part of the state of the art, but considered by the inventors, would be for content router 50 and content router 51 to always advertise a covering set which encompasses the subscriptions of subscribers 53, 54, 55 and 56. However, this technique would be inefficient, since when publisher 36 publishes a message to content router 52 which matches that covering set, content router 52 must send a copy of message over link 62 to content router 50, and send a copy of the message over link 63 to content router 51. However, content router 50 may or may not actually require the message based on the interests of the subscribers 53 and 54, and content router 51 may or may not need the message based on the interests of subscribers 55 and 56. This technique therefore wastes bandwidth on links 62 and 63, and wastes message processing resources on content routers 52 (since it may send more message than necessary) and content routers 50 and 51 (since they receive more messages than necessary). Moreover, as a subscriber such as 53 adds or removes subscriptions, this can cause both content routers 50 and 51 to have to communicate with other content routers to update their covering set and thus result in more control plane resource consumption (memory and processing).

Another possible inventive solution to the above problem not forming part of the state of the art, but considered by the inventors, would be for a content router such as 51 to dynamically re-compute and re-advertise its covering set as it takes over or releases control of a virtual router. For example, when content router 50 fails, content router 51 can advertise a new covering set that now encompasses the subscriptions of subscribers 53, 54, 55 and 56. When content router 50 recovers and provides services again to subscribers 53 and 54, content router 51 can re-advertise a covering set that now only reflects the needs of subscribers 55 and 56. However, the computations involved in such covering set changes, and the resulting content-routing protocol traffic and processing required at each content router in the network is very significant. Thus, while this technique solves the problem of wasting bandwidth as described above, it leads to slow convergence time after a router failure.

While the above description refers to content-routed networks, the same sort of problems exist with any type of routing where there is a significant amount of routing information to be advertised and the information to be advertised is affected by the activity state of the router.

What is desirable is a redundancy scheme for data communication networks that provides a very fast and efficient scheme for reacting to failures.

SUMMARY OF THE INVENTION

According to the present invention there is provided a method a method of providing router redundancy within a distributed network of routers, wherein messages are routed within the network based on virtual router identifiers, comprising organizing said routers into one or more redundancy groups; assigning a physical identifier to each said router in each of said redundancy groups; assigning one or more virtual identifiers to each said redundancy group; selecting one of said routers of a particular redundancy group as a currently active router associated with a particular virtual identifier assigned to that redundancy group; advertising among said distributed network of routers for each redundancy group the physical identifier for the active router and information enabling other routers to determine the virtual identifier with which the currently active router is associated; and forwarding messages destined for a particular virtual router identifier to the currently active router based on the physical identifier of the currently active router.

In this way, when one router of a redundancy group fails, the other router or routers of the redundancy group can take over the tasks of the failed router without affecting routers outside the redundancy group. Moreover, it is not necessary to send messages to routers that do not have relevant subscriptions. Embodiments of the invention therefore provide an efficient method of handling failure within the network.

In one embodiment, each router advertises its physical identifier and one or more virtual identifiers to which it is assigned by virtue of its membership in a particular redundancy group and a priority indicator for that router becoming the currently active router for each said virtual identifier. In this embodiment, the other routers determine the currently active router based on said priority indicator.

In another aspect the invention provides a method of providing router redundancy within a content routed network, wherein subscription are advertised within the network based on virtual router identifiers, comprising organizing said routers into one or more redundancy groups; assigning a physical identifier to each said router in each of said redundancy groups; assigning one or more virtual identifiers to each said redundancy group; selecting one of said routers of a particular redundancy group as a currently active router associated with a particular virtual identifier assigned to that redundancy group; advertising among said distributed network of routers for each redundancy group the physical identifier for the active router and information enabling other routers to determine the virtual identifier with which the currently active router is associated; and forwarding messages destined for a particular virtual router identifier to the currently active router based on the physical identifier of the currently active router.

In a further embodiment, the invention provides a distributed network of routers providing for router redundancy, wherein messages are routed within the network based on virtual router identifiers, wherein said routers are organized into one or more redundancy groups; a physical identifier is assigned to each said router in each of said redundancy groups; one or more virtual identifiers are assigned to each said redundancy group; one of said routers of a particular redundancy group is selected as a currently active router associated with a particular virtual identifier assigned to that redundancy group; said routers are configured to advertise among said distributed network of routers for each redundancy group the physical identifier for the active router and information enabling other routers to determine the virtual identifier with which the currently active router is associated; and said routers are configured to forward messages destined for a particular virtual router identifier to the currently active router based on the physical identifier of the currently active router.

In yet another aspect the invention provides a router for a distributed network of routers providing for router redundancy, wherein messages are routed within the network based on virtual router identifiers, said routers are organized into one or more redundancy groups; a physical identifier is assigned to each said router in each of said redundancy groups; one or more virtual identifiers are assigned to each said redundancy group; and one of said routers of a particular redundancy group is selected as a currently active router associated with a particular virtual identifier assigned to that redundancy group; said router being configured to advertise among said distributed network of routers its physical identifier and information enabling other routers to determine the virtual identifier with which the currently active router is associated; and said router being configured to forward messages destined for a particular virtual router identifier to the currently active router based on the physical identifier of the currently active router.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
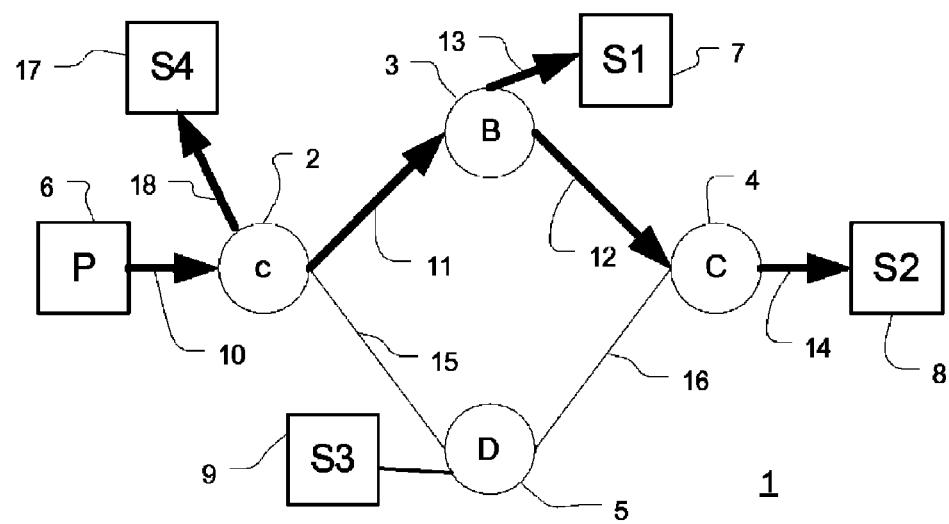
FIG. 1 shows an example content routed network.
Figure 2:
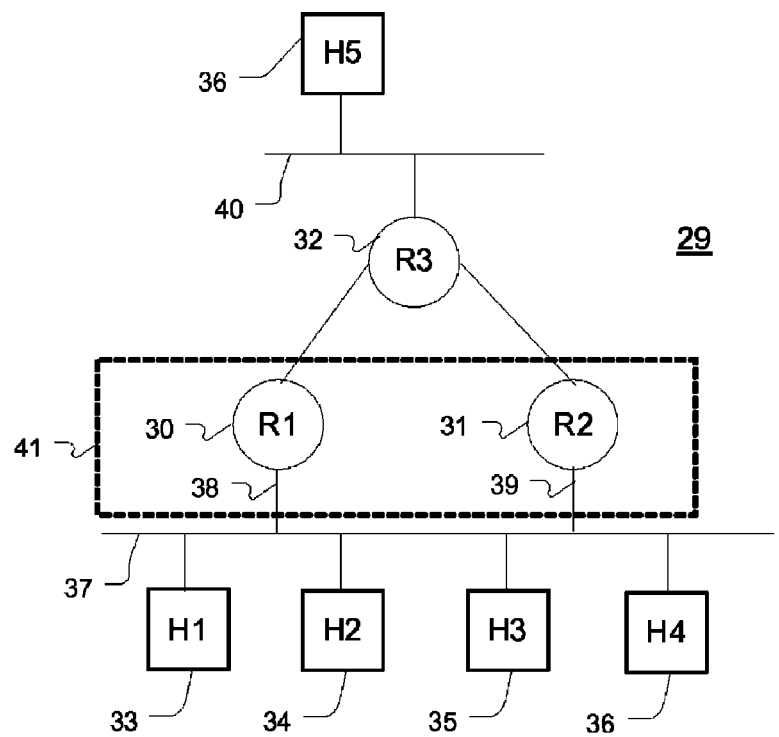
FIG. 2 shows VRRP for IP networks.
Figure 3:
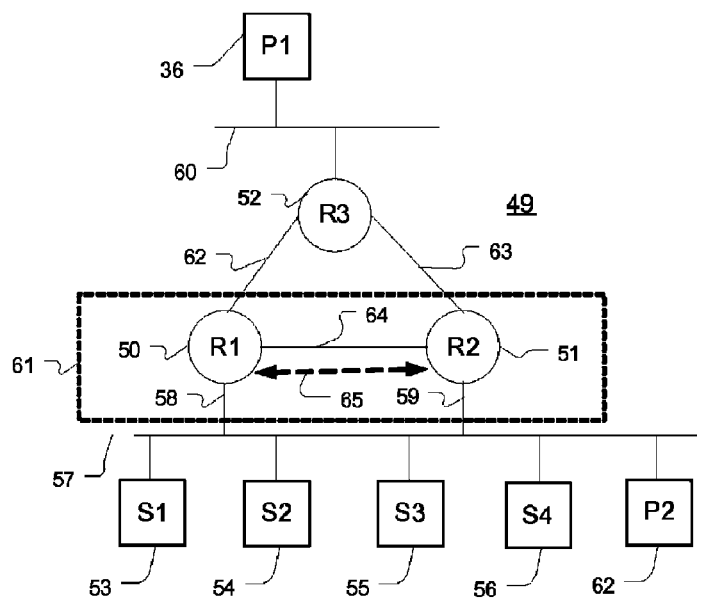
FIG. 3 shows the use of VRRP for content-routed networks.
Figure 4:
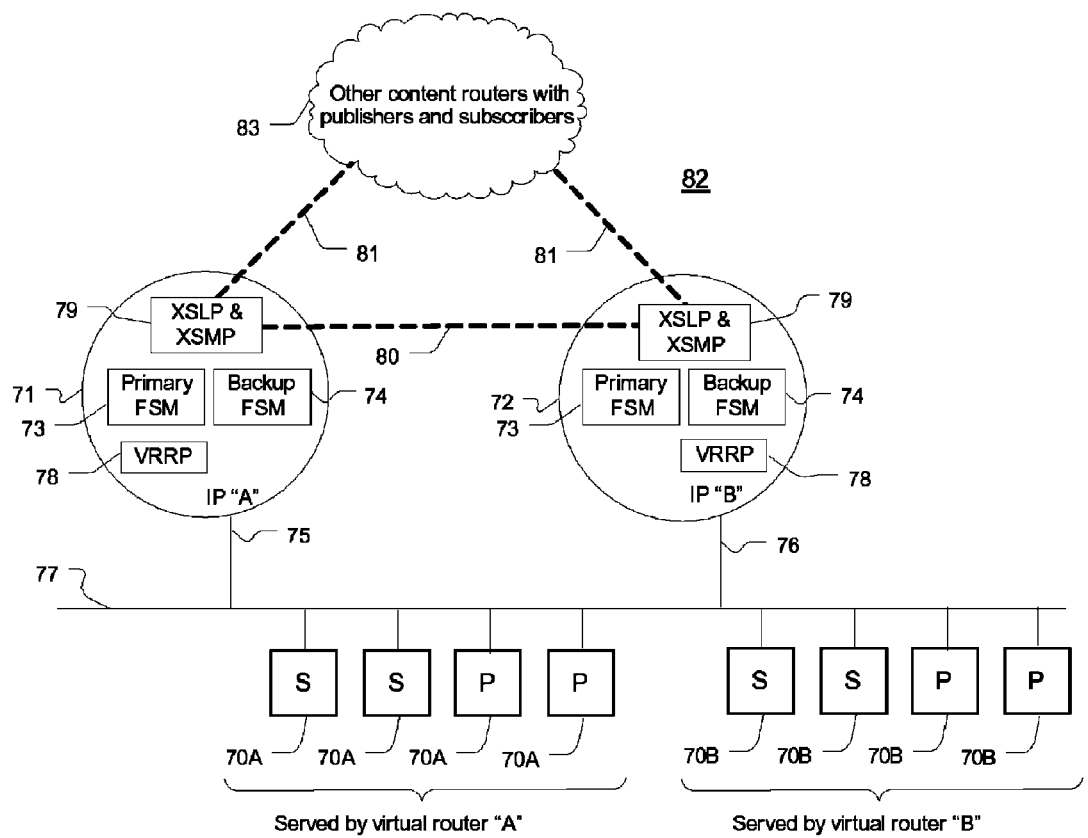
FIG. 4 shows router redundancy for content-routed networks.

In example content routed network 82 of FIG. 4, two content routers 71 and 72 are shown that are participating in active-active router redundancy. With such a redundancy scheme, both routers normally provide service to a subset of publishers and subscribers, but in failure scenarios can take over providing service to the publishers and subscribers of the failed router in addition to their own publishers and subscribers.

In the example network 82, content-routers 71 and 72 each connect to a network 77, which may be a Local Area Network (LAN) or other type of network. Network 77 may be a shared media network, or more typically will be implemented through the use of one or more layer 2 switches as is known in the art. Many types of networks may be utilized, such as Ethernet, Token Ring, SONET, etc.

Content router 71 has interface 75 to network 77, with an IP address of "A". Content router 72 has interface 76 to network 77, with an IP address of "B". Content-router 71 is the IP address owner of IP "A", and content-router 72 is the IP address owner of IP "B", as per RFC 3768. This yields two virtual routers, referred to as "A" and "B". The interface such as 75 or 76 to network 77 may be a logical interface comprised of a number of physical interfaces running together to form a logical higher-speed interface, through techniques such as Ethernet Link Aggregation, as known in the art. In such an aggregation scheme, a failure of one physical link reduces the bandwidth available for the logical interface, but allows the logical interface to continue to function.

Subscribers and publishers 70A receive service from virtual router "A". 70A consists of zero or more subscribers (shown in figures with the letter "S") and zero or more publishers (shown in figures with the letter "P"). Note that such a group of publishers and subscribers can contain a very large number of entities, such as tens of thousands of hosts. Subscribers and publishers 70A connect to (or accept connections from) a virtual content-router with an IP address of "A". It will be understood that in addition to the IP address of a content-router, if a protocol such as TCP or UDP is used as part of the protocol to communicate with the content router, then a port number, such as a TCP port number, is also used in addition to the IP address. The publishers and subscribers 70A can be configured with the IP address of the virtual router to use, or can be configured with a virtual router host name which resolved through a directory service such as Directory Naming Service (DNS), or other techniques that are known in the art.

Similarly, subscribers and publishers 70B receive service from virtual router "B".

Content-router 71, when fully operational, provides service for virtual router "A", and content-router 72 provides service for virtual router "B". The VRRP protocol 78, as per RFC 3768 of the Internet Engineering Task Force (IETF), runs on networks 77 to determine which content-router is providing service for each virtual router instance.

Unlike IP routers, which forward packets based on destination addresses, a content router terminates traffic from publishers (for example, by terminating a TCP connection from the publisher), in order to examine each published message, and then to route it forward to required local subscribers and other content routers (over a different TCP connection, assuming TCP is the preferred protocol in use). Thus, a physical router must terminate traffic addressed to the IP address of a virtual router, regardless of whether it is the primary IP address owner or is acting in a backup capacity when the primary address owner is not available. This is a departure from RFC 3768, which states that a router running in {Master} state must NOT accept packets addressed to the IP address(es) associated with the virtual router if it is not the IP address owner. In a similar manner, a content-router must accept connections from subscribers so that subscribers can add or remove subscriptions, and so that the content router can deliver messages to the subscriber. Alternatively, the content-router can establish a connection to the subscriber to deliver messages.

While FIG. 4 only shows two content-routers participating in router redundancy on network 77, it will be understood that more than two routers can participate in the redundancy scheme as per RFC 3768, and that more networks such as 77 can be involved.

In the preferred embodiment, the content routers run the XML Link State Protocol (XLSP) and the XML Subscription Management Protocol (XSMP), as shown by function 79. These protocols are disclosed in Ser. No. 11/012,113. The XLSP and the XSMP protocols are adapted to support efficient router redundancy as explained below.

Each content-router participating in active-active redundancy preferentially has a direct XLSP adjacency to each other active-active router participating in the redundancy group, as shown by 80. Content routers 71 and 72 will also have zero or more XLSP adjacencies 81 to other content-routers (not shown) in the content-routed network 82. Preferentially, each content-router in the active-active group will have the same set of XLSP adjacencies configured. This aids in the network recovery time when a content-router that is part of an active-active group fails.

Figure 5:
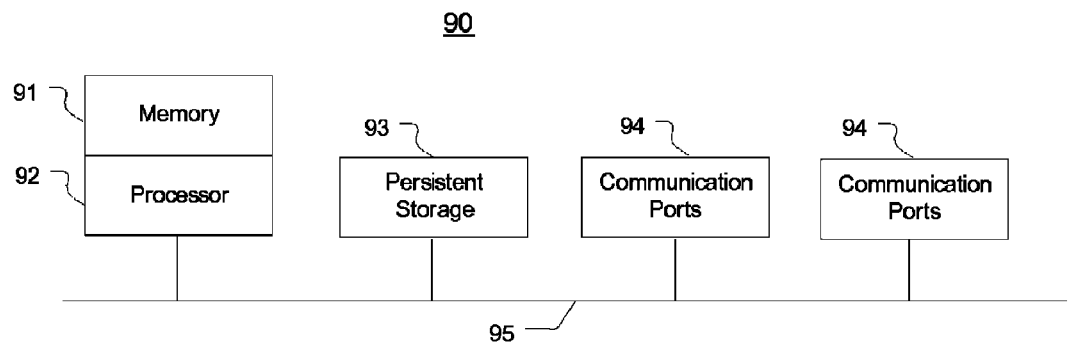
FIG. 5 shows a block diagram of a router that may be used in this invention.

FIG. 5 shows a block diagram of an exemplary content-router 90 of the present invention, which includes a (or many) central processing unit (CPU) 92 with associated memory 91, persistent storage 93, a plurality of communication ports 94, and a communication bus 95. The processor 92 is responsible for tasks such as running content routing protocols XLSP and XSMP, running VRRP protocols, computing routing tables, processing received documents or messages and routing them based on content (which may involve specialized hardware assist which is outside the scope of this invention), and other router tasks known in the art. The associated memory 91 is used to hold the instructions to be executed by processor 92 and data structures such as routing tables and protocol state. The persistent storage 93 is used to hold configuration data for the router, event logs, and programs for the processor 92. The persistent storage 93 may be redundant hard disks, flash memory disks or other similar devices. The communication ports 94 are the ports which the router uses to communicate with other devices, such as other routers and hosts (publishers and subscribers). Many different technologies can be used, such as Ethernet, Token Ring, SONET, etc. The communications bus 95 allows the various router components to communicate with one another, and may be a PCI bus (with associated bridging devices) or other inter-device communication technologies known in the art.

Figure 6:
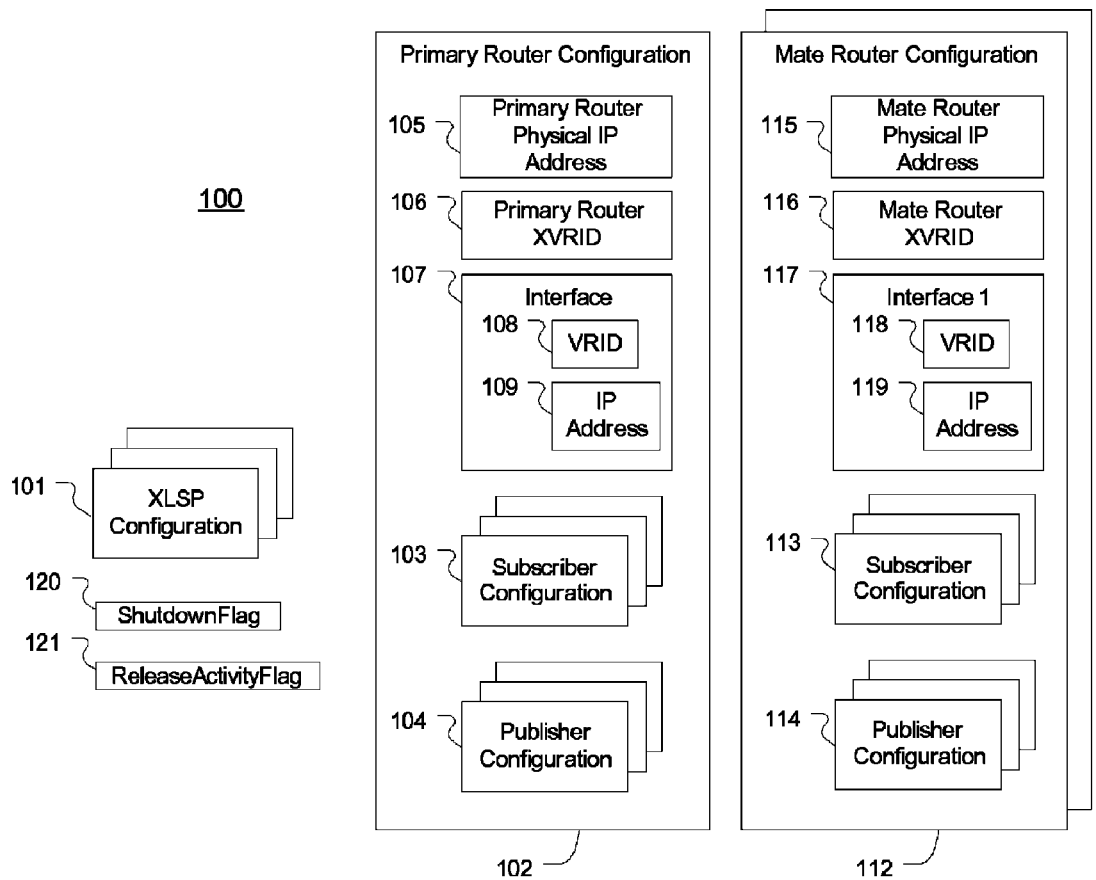
FIG. 6 shows the main configuration items related to router redundancy.

FIG. 6 shows the main configuration items 100 related to content-router redundancy. These configuration items would be present on each content-router, such as 71 and 72, although the configuration values are different on each content-router. The configuration items are stored in persistent storage 93. The XLSP configuration 101 reflects the configuration involved with XLSP, such as the XLSP adjacencies to maintain between this content-router and other content-routers (such as 80 and 81 of FIG. 4). As explained above, this preferentially includes an adjacency 80 to each content-router which this content router is backing up. Also note that preferentially each content-router involved in a redundancy group (e.g. 71 and 72 of FIG. 4) will be configured with the same set of XLSP adjacencies.

A content router has a ShutdownFlag 120 associated with it, which is set to indicate that the active-active redundancy capability has been disabled (or shutdown). When cleared, the active-active capability is enabled.

A content router has a ReleaseActivityFlag associated with it, which is set to indicate that the router is not to take activity. This is set due to a management command requesting that the router not be active. For example, this is desirable when the router needs to be taken off-line for activities such as a software upgrade.

A content-router has primary configuration items 102 related to it. In configuration item 102, there are configuration items 103 through 109. The subscriber configuration 103 contains information about each subscriber that is served preferentially by the router (but may be served by a backup router due to the use of VRRP). Such configuration information can include identity and authorization information for each subscriber, such as username and passwords, public key certificates, etc. Other information related to each subscriber can be what privileges or services each subscriber is entitled to. The publisher configuration 104 contains information about each publisher that is served preferentially by the router (by may be served by a backup router due to the use of VRRP). Such configuration information can include identity and authorization information for each publisher, such as username and passwords, public key certificates, etc. Other information related to each publisher can be what privileges or services each publisher is entitled to.

The primary router physical IP address 105 is an IP address that is used by other content-routers to communicate to this content-router, e.g. to establish XLSP adjacencies. This address is always associated with this content-router as is never taken over by another content-router due to VRRP. VRRP introduces the concept of a Virtual Router Identifier (VRID). In the case of an XML-based network, this becomes an XVRID. The primary router XVRID 106 is an IP address which represents the virtual router that may be served by the primary router or by one of the backup routers due to a failure. It can be taken from the IP address 109 of one of the interfaces being backed up, or may be an independent IP address. This IP address is used to virtualize the content routing information which is distributed by XLSP and XSMP as explained below.

Each primary interface which is being backed up has interface configuration 107. This includes the VRID 108 as per RFC 3768 and the interface IP address 109. Address 109 is the address which is used by publishers and subscribers to connect to the virtual router, and this address can be taken over by a backup router due to the actions of VRRP as per RFC 3768.

The content-router also has mate configuration information 112 for each content-router that this content-router can back up. For example, in FIG. 4, content-router 71 would have a primary router configuration 102 for itself, and a mate router configuration 112 for content-router 72. Content-router 72 would have a primary router configuration 102 for itself, and a mate router configuration 112 for content-router 71. Note that a content-router can back up a plurality of other content-routers.

The mate router physical IP address is the IP address used by the mate router to run the XLSP and XSMP protocol. The mate router XVRID 116 (also called the Backup XVRID) is an IP address used to represent the virtual mate router. The interface configuration 117 for the mate router is present for each mate interface being backed up, and contains a VRID 118 and an interface address 119. The mate router information also includes subscriber configuration 113 for each subscriber that is preferentially served by the mate router, and publisher configuration 114 for each publisher that is preferentially served by the mate router. The mate subscriber and mate publisher information is needed so that the content-router has the information it needs to serve these subscribers and publishers if it is required to take over for a failed mate router.

Note that there is some configuration duplicated on the content routers 71 and 72. For example, when a subscriber is configured into subscriber configuration 103 of content router 71, the same subscriber must be configured into configuration block 113 of the content router 72. This can be done manually on each content router; an element management system can enter the required information into both content routers, or content router 71 can automatically synchronize this information with the mate router 72 when it is configured on router 71.

Referring to FIG. 4, a content router such as 71 is the "primary router" for itself, and can serve as a "backup router" for one or more other content routers, such as 72. Thus, a given content router can be simultaneously serving a "primary" role and a "backup" role(s). A primary redundancy finite state machine (FSM) is run for the "primary" role, referred to as the primary FSM 73, and a backup redundancy FSM is run for each instance of a "backup" role, referred to as the backup FSM 74. The primary FSM 73 determines whether or not the router should be active for the primary XVRID 106, and the backup FSM 74 determines whether or not the router should be active for the mate router XVRID 116.

Figure 7:
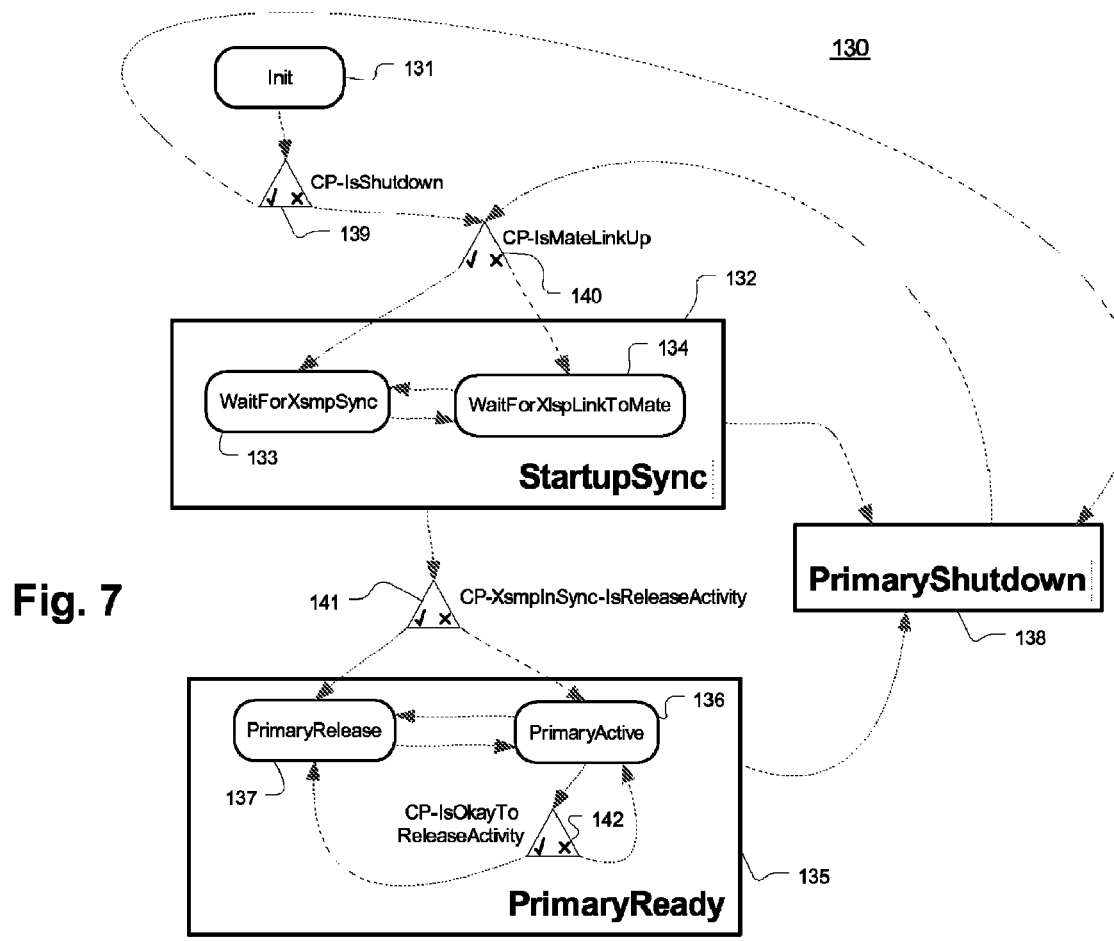
FIG. 7 shows the primary finite state machine.

FIG. 7 shows the parent states, child states and choice points (CP) that comprise the primary FSM 130. The FSM is comprised of parent states Init 131, StartupSync 132, PrimaryReady 135 and PrimaryShutdown 138.

The Init parent state 131 is the starting point of the primary FSM 130. It has no child states, and it simply proceeds once initialized to choicepoint 139.

The StartupSync parent state 132 is active when the router is attempting to synchronize state with the backup router. It consists of child states WaitForXsmpSync 133 and WaitForXlspLinkToMate 134. WaitForXlspLinkToMate 134 is active when the primary router is waiting for the XLSP link to the mate router to become operational. WaitForXsmpSync 133 is active when the primary router is waiting for the XSMP synchronization with its mate router to complete.

The PrimaryReady parent state 135 is active when the primary router is ready to be active. It consists of child states PrimaryActive 136 and PrimaryRelease 137. PrimaryActive 136 is active when the primary router is active on its own behalf. PrimaryRelease 137 is active when the primary router could be active on its own behalf, but is not since a management command has been issued to release activity.

The PrimaryShutdown parent state 138 is active when the active-active redundancy feature has been disabled through a configuration command. It has no child states.

The choice points CP-IsShutdown 139, CP-IsMateLinkUp 140, CP-XsmpInSync-IsReleaseActivity 141 and CP-IsOkayToReleaseAcitivity 142 are used to decide between two destinations (which can be a state or another choicepoint) based on a check of a condition.

Table 1 below explains the events that are processed by the primary FSM 130.

TABLE 1

| Event | Description |
| --- | --- |
| FSM Initialized | The FSM has been activated to run. Only applies to the Init state 131. |
| XLSP-MateLinkUp | XLSP has determined that the XLSP adjacency 80 between the router and the mate router has come up and is operational (as determined by the XLSP state machine documented in 11/012,113) |
| XLSP-MateLinkDown | XLSP has determined that the XLSP adjacency 80 between the router and the mate router is no longer operational. |
| Timeout | A timer that has been started in the state has expired. Unless otherwise indicated, all times are started with duration of 10 seconds. |

TABLE 1-continued

| Event | Description |
|---|---|
| VRRP-LocalActive | The VRRP protocol (refer to RFC 3768) has determined that the local router (the one running the primary FSM in question) has been elected as active for the virtual router. |
| VRRP-RemoteActive | The VRRP protocol has determined that the mate router has been elected as active for the virtual router. |
| Mgmt-ReleaseActivity | A management configuration command has been issued indicating that the router should attempt to release activity for the virtual router if possible. |
| Mgmt-NoReleaseActivity | A management configuration command has been issued canceling a previously issued release activity command. |
| Mgmt-Shutdown | A management configuration command has been issued disabling operation of the active-active redundancy capability. |
| Mgmt-NoShutdown | A management configuration command has been issued enabling operation of the active-active redundancy capability. |
| XSMP-DsdbXsdbSynced | The XSMP protocol has determined that the Direct Subscriber Database (DSDB) and the XML Subscription Database (XSDB) are synchronized between the two nodes. |

The redundancy logic uses a number of priority values. These priority values are used both within the VRRP protocol and within the XLSP protocol. The priority values used are listed in Table 2, ordered from highest priority to lowest priority. Note that the priority values in Table 2 below are examples only, and other values can be used as long as the values chosen are identical across all the routers, and the relative order is preserved.

TABLE 2

| Priority | Description | Value |
|---|---|---|
| VrrpOwner | This is a special priority defined in the VRRP protocol that is used to indicate that a router is the physical owner of the IP address, and all other routers must yield ownership of the address to the advertising router. This priority is used to advertise the primary XVRID whenever the redundancy feature is "shutdown" on the router. | 255 |
| PrimaryAsssertActivity | A router configured as primary will initiate a Link State Protocol (LSP) update with this priority when it decides that it is the "master" of the XVRID, and wants to ensure that all routers in the network recognize it as the master. After a timeout period, the LSP will be advertised again, but the priority will be reduced to PrimaryActive. | 255 |
| BackupAssertActivity | A router configured as backup will initiate an LSP update with this priority when it decides that the primary router has failed. If the primary router has not failed (i.e. it receives an LSP with BackupAssertActive for its own XVRID), it will take control back immediately by flooding an LSP with PrimaryAssertActivity. After a timeout period, the LSP will be advertised again, but the priority will be reduced to Backup. Note that because BackupAssertActivity is higher than PrimaryPriority, it ensures that all the routers in the network start forwarding documents or messages to the backup router as soon as the LSP is flooded. This allows the network to switch to the backup router without needing to wait until XLSP declares that the primary router is unreachable. | 254 |
| PrimaryActive | This is the normal priority level that the primary router uses to advertise the binding of its XVRID to its physical address. | 200 |
| Backup | This is the normal priority level that the backup router uses to advertise the binding of its mate's XVRID to its own physical address. | 100 |
| PrimaryReconcile | This is the priority that a router uses to advertise its own XVRID when it first starts up, to ensure that it does not take activity before it has reconciled its subscription database with the backup router that may have been acting on its behalf. Used by the "owner" of the router ID | 75 |

TABLE 2-continued

| Priority | Description | Value |
|---|---|---|
| | when it is initializing, and would rather not take activity unless the backup router is also unavailable. | |
| BackupReconcile | This is the priority that a router uses when it first starts up, to advertise the binding of its mate's XVRID to its own physical address. Used by the backup router when it is initializing, to indicate it will not take activity even if the primary router is unavailable | 50 |
| ReleaseActivity | This is the priority that a router uses to advertise its mate's XVRID after the operator has executed a "release activity" command through the management interface. Being the lowest priority, this ensures that the router will not continue to route traffic for the XVRID | 0 |

A given event and the resulting action and possible state transition can be handled by the parent state (indicated by an action for the event of "Parent" in the child state) or the child state (indicated by an action of "Child" in the parent state) in the FSM. If a parent state indicates a next state of itself, then this means that the current child state remains active, and no state transition occurs (along with no execution of state entry or state exit logic). An action of "None" indicates that there is no action to carry out, but there can still be a state change. An action of "Log Error" indicates a condition which is not expected to occur, and an error log should be raised in the system.

Figure 8:
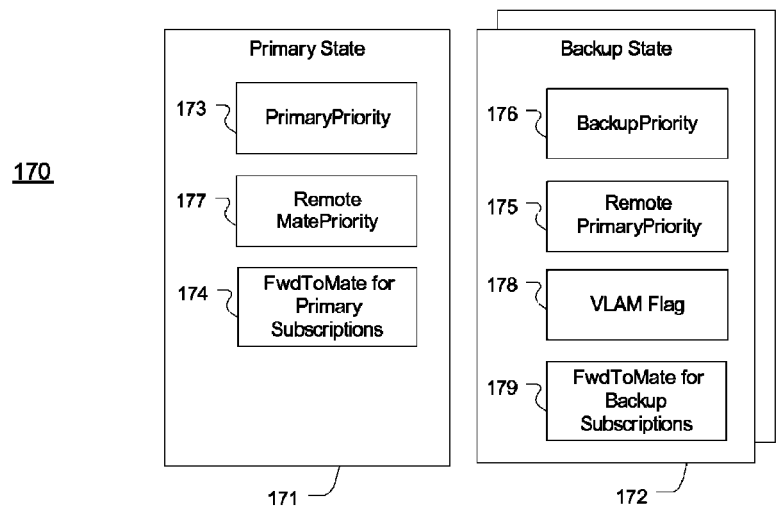
FIG. 8 shows state information used by primary and backup FSMs.

FIG. 8 shows state information 170 that is used by the Primary FSM 130 and/or the Backup FSM 160. This state information 170 is stored in memory 91. Some of the information relates to primary state 171, i.e. state information for the virtual router which this router normally wants to be active for, and for which the mate router is providing backup. The other information relates to backup state 172, i.e. state information for the virtual router which the mate router normally wants to be active for, and for which this router is providing backup.

For the primary state 171, the PrimaryPriority 173 is the priority that this router is advertising (in VRRP and XLSP) for its primary virtual router. The RemoteMatePriority 177 is the priority advertised by the mate router (in VRRP and XLSP) for the same virtual router (the mate is providing backup). The FwdToMate for Primary Subscriptions 174 indicates to the dataplane how to treat the primary subscriptions, as explained in Table 3 below.

For the backup state 172, the BackupPriority 176 is the priority that this router is advertising (in VRRP and XLSP) for the virtual router which the mate router is normally active for (and for which this router is providing backup). The RemotePrimaryPriority 175 is the priority advertised by the mate router (in VRRP and XLSP) for its primary virtual router (the one for which this router is providing backup). The FwdToMate for Backup Subscriptions 179 indicates to the dataplane how to treat the backup subscriptions, as explained in Table 17 below. The VLAM Flag 178 (VLAM stands for VRRP Local Active For Mate) is a state flag used by the backup FSM 160.

Some of the actions in the primary FSM 130 involve signaling information to other subsystems in the router. These are detailed in Table 3 below. Note that some of these actions are also carried out by the backup FSM 160.

TABLE 3

| Action | Description |
|---|---|
| SignalToXsmp - Treat mate XVRID 116 as mate router | This tells the XSMP subsystem 79 that the mate XVRID 116 should be treated as a mate router, i.e. a router that is participating with this router in the redundancy protocol. Refer to 11/012,113 for details of XSMP. |
| SignalToXsmp - Treat mate XVRID 116 as a normal router | This tells the XSMP subsystem 79 that the mate XVRID 116 should be treated as a normal router, i.e. treat it like any other router in the network 83 that is not involved in the redundancy protocol with this router. This is done when the redundancy capability is not enabled. |
| SignalToDp - Set FwdToMate for Primary Subscriptions 174 | This tells the dataplane (DP) subsystem (the subsystem that is responsible for the reception, content inspection, route lookup, and transmission of messages) that primary subscriptions (i.e. those received from subscribers that this router is normally the primary router for) should be treated as if they belong to the mate router. This is done when the mate router is responsible for handling the primary subscribers and subscriptions. |
| SignalToDp - Clear FwdToMate for Primary Subscriptions 174 | This tells the dataplane subsystem that primary subscriptions should be treated as if they belong to this router. This is done when this router is responsible for handing the primary subscribers and subscriptions. |

TABLE 3-continued

| Action | Description |
| --- | --- |
| SignalToDp - Activate primary XVRID 106 | This tells the dataplane subsystem that it should terminate traffic addressed to the primary XVRID 106, i.e. the dataplane is the active user of the primary XVRID 106 address. This means that this router will process traffic addressed to the primary XVRID 106. |
| SignalToDp - Deactivate primary XVRID 106 | This tells the dataplane subsystem that is should not terminate traffic addressed to the primary XVRID 106. |
| SignalToXlsp - FloodLSP | This tells the XLSP subsystem 79 that it should flood a Link State Protocol (LSP) Packet for the router to refresh its LSP in the other routers of the network. This is done to update the router's primary priority. Refer to 11/012,113 for details of XLSP. |
| SignalToXsmp - Flood SU Summary | This tells the XSMP subsystem 79 that it should flood a Subscription Update Summary. This is done to ensure that other routers have an up-to-date view of the valid sequence number range for the subscriptions of this router. This may trigger the other routers to ask this router for subscription update packets if they are missing information. |
| SignalToBackupFsm - ReleaseActivity | This causes a "PrimaryFSM-ReleaseActivity" event to be sent to the backup FSM 74 for it to process. |
| SignalToBackupFSM - NoReleaseActivity | This causes a "PrimaryFSM-NoReleaseActivity" event to be sent to the backup FSM 74 for it to process. |
| SignalToBackupFSM - PrimaryFSMReady | This causes a "PrimaryFSM-Ready" event to be sent to the backup FSM 74 for it to process. |

As shown in the state tables below, when the primary FSM 130 for a router starts up, it sets its priority 173 to a very low priority. This ensures that if the backup router is providing service, it will continue to provide service while the subscription databases are being reconciled between the two routers. However, if VRRP indicates that there is no backup router providing service, the primary router will immediately assert activity (increasing its priority level 173 in XLSP and VRRP accordingly), and begin providing service for the primary XVRID 106, even if the databases have not been reconciled.

Once the databases have been reconciled, the primary FSM 130 will assert activity for the primary XVRID 106. From this point onward, the primary FSM 130 will never surrender activity for that XVRID 106 (except if it has been told to release activity through a management request). If the primary FSM 130 receives an indication from either VRRP or XLSP that the mate router is attempting to assert activity for the primary XVRID 106, the primary FSM 130 will respond by increasing its priority level 173 in both XLSP and VRRP to PrimaryAssertActivity. This is the highest priority level used by the routers, and ensures that the primary FSM 130 maintains control of its XVRID 106.

A management request to "release activity" will cause the Primary FSM 130 to reduce the primary XVRID priority 173 to "ReleaseActivity" (the lowest priority supported by the routers) if the mate router is in a state where it can take over activity. The Primary FSM 130 will signal the backup FSM 160 to release activity as well.

A management request to "shutdown" the redundancy capability will cause the Primary FSM 130 to increase the primary XVRID priority 173 to "PrimaryAssertActivity", which cannot be overriden by a backup router. At the same time, the Primary FSM 130 will tell XSMP to start treating the mate as a "normal" router, rather than a mate router, and will signal the backup FSM 160 to release activity.

Table 4 below specifies the logic for the Init state 131. Note that in this table and the similar state tables that follow, "STATE" refers to the state identifier; "PARENT STATE" refers to the parent state of this state, if any; "Entry Actions" indicate the logic that is executed on entry to this state; "Exit Actions" indicate the logic that is executed on exit from this state; "Event" indicates each event that the state may receive; "Action" indicates the action carried out when the event is received; and "Next State or Choicepoint" indicates the next state or choicepoint entered as a result of receiving the event.

TABLE 4

| STATE: Init 131 | | PARENT STATE: None |
| --- | --- | --- |
| Entry Actions: None | | |
| Event | Action | Next State or Choicepoint |
| FSM Initialized | None | CP-IsShutdown 139 |
| Exit Actions: None | | |

Table 5 below specifies the logic for the choicepoint CP-IsShutdown 139. Note that in this table and the similar choicepoint tables that follow, "CHOICE" refers to the choicepoint identifier; "Test" refers to logic test performed by the choicepoint; "Result" indicates the result of the logic test (True or False); "Action" indicates the action carried out when the specified result occurs; and "Next State or Choicepoint" indicates the next state or choicepoint entered as a result of the test result occurring.

TABLE 5

CHOICE: CP-IsShutdown 139
    Test: Is ShutdownFlag 120 set in persistent store?

| Result | Action | Next State or Choicepoint |
|---|---|---|
| True | None | Primary-Shutdown 138 |
| False | SignalToXsmp - Treat mate XVRID 116 as mate router;<br>SignalToDp - Set FwdToMate for Primary Subscriptions 174<br>SignalToDp - deactivate primary XVRID 106<br>if (ReleaseActivityFlag 121 set in persistent store 93)<br>{<br>   PrimaryPriority 173 = ReleaseActivity;<br>}<br>else<br>{<br>   PrimaryPriority 173 = PrimaryReconcile;<br>}<br>SignalToXlsp - FloodLSP; | CP-IsMateLinkUp 140 |

Table 6 below specifies the logic for the choicepoint CP-IsMateLinkUp 140.

TABLE 6

CHOICE: CP-IsMateLinkUp 140
    Test: Is XLSP Link to Mate up?

| Result | Action | Next State or Choicepoint |
|---|---|---|
| True | None | WaitForXsmpSync 133 |
| False | None | WaitForXlspLinkToMate 134 |

Table 7 below specifies the logic for the parent state StartupSync 132.

TABLE 7

STATE: StartupSync 132      PARENT STATE: None
    Entry Actions: None

| Event | Action | Next State or Choicepoint |
|---|---|---|
| XLSP-MateLinkUp | Child | |
| XLSP-MateLinkDown | Child | |
| Timeout | Child | |
| VRRP-LocalActive | if not (ReleaseActivityFlag 121 set in persistent store 93)<br>{<br>   SignalToDp - Clear FwdToMate for Primary Subscriptions 174;<br>   SignalToDp - activate primary XVRID 106<br>} | StartupSync 132 |
| VRRP-RemoteActive | SignalToDp - Set FwdToMate for Primary Subscriptions 174<br>SignalToDp - deactivate primary XVRID 106 | StartupSync 132 |
| XLSP-LocalActive | None | StartupSync 132 |
| XLSP-RemoteActive | SignalToDp - Set FwdToMate for Primary Subscriptions 174<br>SignalToDp - deactivate primary XVRID 106 | StartupSync 132 |
| Mgmt-ReleaseActivity | if ((RemotePrimaryPriority 175 >= PrimaryActive) &&<br>   (RemoteMatePriority 177 >= Backup))<br>{<br>   set ReleaseActivityFlag 121 in persistent store 93;<br>   PrimaryPriority 173 = ReleaseActivity;<br>   SignalToBackupFsm - ReleaseActivity;<br>   SignalToXlsp - Flood LSP;<br>   SignalToDp - Set FwdToMate for Primary Subscriptions 174<br>   SignalToDp - deactive primary XVRID 106<br>   return OK;<br>}<br>else<br>{<br>   return ERROR-MateNotReady;<br>} | StartupSync 132 |

TABLE 7-continued

| | | |
|---|---|---|
| Mgmt-NoReleaseActivity | Clear ReleaseActivityFlag 121 in persistent store 93<br>SignalToBackupFSM - NoReleaseActivity;<br>if (PrimaryPriority 173 == ReleaseActivity)<br>{<br>   PrimaryPriority 173 = PrimaryReconcile;<br>   SignalToXlsp - Flood LSP<br>} | StartupSync 132 |
| Mgmt-Shutdown | None | PrimaryShutdown 138 |
| Mgmt-NoShutdown | None | StartupSync 132 |
| XSMP-DsdbXsdbSynced | Child | |

Exit Actions: None

Table 8 below specifies the logic for the child state WaitForXlspLinkToMate 134.

TABLE 8

| STATE:<br>WaitForXlspLinkToMate 134 | | PARENT STATE:<br>StartupSync 132 |
|---|---|---|
| Entry Actions: StartTimer | | |
| Event | Action | Next State or Choicepoint |
| XLSP-MateLinkUp | None | WaitForXsmpSync 133 |
| XLPS-MateLinkDown | None | WaitForXlspLinkToMate 134 |
| Timeout | None | CP-XsmpInSync-IsReleaseActivity 141 |
| VRRP-LocalActive | Parent | |
| VRRP-RemoteActive | Parent | |
| XLSP-LocalActive | Parent | |
| XLSP-RemoteActive | Parent | |
| Mgmt-ReleaseActivity | Parent | |
| Mgmt-NoReleaseActivity | Parent | |
| Mgmt-Shutdown | Parent | |
| Mgmt-NoShutdown | Parent | |
| XSMP-DsdbXsdbSynced | Log Error | WaitForXlspLinkToMate 134 |

Exit Actions: StopTimer

Table 9 below specifies the logic for the child state WaitForXsmpSync 133.

TABLE 9

| STATE:<br>WaitForXsmpSync 133 | | PARENT STATE:<br>StartupSync 132 |
|---|---|---|
| Entry Actions: None | | |
| Event | Action | Next State or Choicepoint |
| XLSP-MateLinkUp | None | WaitForXsmpSync 133 |
| XLSP-MateLinkDown | None | WaitForXlspLinkToMate 134 |
| Timeout | None | WaitForXsmpSync 133 |
| VRRP-LocalActive | Parent | |
| VRRP-RemoteActive | Parent | |
| XLSP-LocalActive | Parent | |
| XLSP-RemoteActive | Parent | |
| Mgmt-ReleaseActivity | Parent | |
| Mgmt-NoReleaseActivity | Parent | |
| Mgmt-Shutdown | Parent | |
| Mgmt-NoShutdown | Parent | |
| Xsmp-DsdbXsdbSynced | None | CP-XsmpInSync-IsReleaseActivity 141 |
| Exit Actions: | None | |

Table 10 below specifies the logic for the choicepoint CP-XsmpInSync-IsReleaseActivity 141.

TABLE 10

CHOICE: CP-XsmpInSync-IsReleaseActivity 141
Test: Is ReleaseActivityFlag 121 set in persistent store 93?

| Result | Action | Next State or Choicepoint |
|---|---|---|
| True | None | PrimaryRelease 137 |
| False | None | PrimaryActive 136 |

Table 11 below specifies the logic for the parent state PrimaryReady 135.

TABLE 11

| STATE: PrimaryReady 135 | | PARENT STATE: None |
|---|---|---|
| Entry Actions: | None | |
| Event | Action | Next State or Choicepoint |
| XLSP-MateLinkUp | None | PrimaryReady 135 |
| XLSP-MateLinkDown | None | PrimaryReady 135 |
| Timeout | Child | |
| VRRP-LocalActive | None | PrimaryReady 135 |
| VRRP-RemoteActive | Child | |
| XLSP-LocalActive | None | PrimaryReady 135 |
| XLSP-RemoteActive | Child | |
| Mgmt-ReleaseActivity | Child | |
| Mgmt-NoReleaseActivity | Child | |
| Mgmt-Shutdown | None | PrimaryShutdown 138 |
| Mgmt-NoShutdown | None | PrimaryReady 135 |
| XSMP-DsdbXsdbSynced | None | PrimaryReady 135 |
| Exit Actions: | None | |

Table 12 below specifies the logic for the child state PrimaryActive 136.

TABLE 12

| STATE: PrimaryActive 136 | PARENT STATE: PrimaryReady 135 |
| --- | --- |
| Entry Actions: | PrimaryPriority 173 = PrimaryAssertActivity;<br>StartTimer;<br>SignalToBackupFSM - PrimaryFSMReady;<br>SignalToXlsp - Flood LSP;<br>SignalToXsmp - Flood SU Summary;<br>SignalToDp - Clear FwdToMate for PrimarySubscriptions 174;<br>SignalToDp - Activate Primary XVRID 106; |

| Event | Action | Next State or Choicepoint |
| --- | --- | --- |
| XLSP-MateLinkUp | Parent | |
| XLSP-MateLinkDown | Parent | |
| Timeout | PrimaryPriority 173 = PrimaryActive;<br>SignalToXlsp - Flood LSP | PrimaryActive 136 |
| VRRP-LocalActive | Parent | |
| VRRP-RemoteActive | PrimaryPriority 173 = PrimaryAssertActivity;<br>StartTimer;<br>SignalToXlsp - Flood LSP<br>SignalToXsmp - Flood SU Summary | PrimaryActive 136 |
| XLSP-LocalActive | Parent | |
| XLSP-RemoteActive | PrimaryPriority 173 = PrimaryAssertActivity;<br>StartTimer;<br>SignalToXlsp - Flood LSP<br>SignalToXsmp - Flood SU Summary | PrimaryActive 136 |
| Mgmt-ReleaseActivity | None | CP-IsOkayToReleaseActivity 142 |
| Mgmt-NoReleaseActivity | None | PrimaryActive 136 |
| Mgmt-Shutdown | Parent | |
| Mgmt-NoShutdown | Parent | |
| XSMP-DsdbXsdbSynced | Parent | |

| Exit Actions: | StopTimer |
| --- | --- |

Table 13 below specifies the logic for the child state PrimaryRelease 137.

TABLE 13

| STATE: PrimaryRelease 137 | PARENT STATE: PrimaryReady 135 |
| --- | --- |
| Entry Actions: | None |

| Event | Action | Next State or Choicepoint |
| --- | --- | --- |
| XLSP-MateLinkUp | Parent | |
| XLSP-MateLinkDown | Parent | |
| Timeout | None | PrimaryRelease 137 |
| VRRP-LocalActive | Parent | |
| VRRP-RemoteActive | None | PrimaryRelease 137 |
| XLSP-LocalActive | Parent | |
| XLSP-RemoteActive | None | PrimaryRelease 137 |
| Mgmt-ReleaseActivity | None | PrimaryRelease 137 |
| Mgmt-NoReleaseActivity | Clear ReleaseActivity flag 121 in persistent store 93; | PrimaryActive 136 |
| Mgmt-Shutdown | Parent | |
| Mgmt-NoShutdown | Parent | |
| XSMP-DsdbXsdbSynced | Parent | |

| Exit Actions: | None |
| --- | --- |

Table 14 below specifies the logic for the choicepoint CP-IsOkayToReleaseActivity 142.

TABLE 14

| CHOICE: CP-IsOkayToReleaseActivity 142 | |
| --- | --- |
| Test: | ((RemotePrimaryPriority >= PrimaryActive) && (RemoteMatePriority >= Backup)) ? |

| Result | Action | Next State or Choicepoint |
| --- | --- | --- |
| True | Set ReleaseActivity flag 121 in persistent store 93<br>PrimaryPriority 173 = ReleaseActivity;<br>SignalToBackupFSM - ReleaseActivity;<br>SignalToXlsp - FloodLSP;<br>SignalToDp - Set FwdToMate for Primary Subscriptions 174<br>SignalToDp - Deactive primary XVRID 106<br>Return OK | PrimaryRelease 137 |
| False | Return ERROR-MateNotReady | PrimaryActive 136 |

Table 15 below specifies the logic for the parent state PrimaryShutdown 138.

TABLE 15

| STATE: PrimaryShutdown 138 | PARENT STATE: None |
| --- | --- |
| Entry Actions: | Set ShutdownFlag 120 in persistent store;<br>PrimaryPriority 174 = PrimaryAssertActivity;<br>SignalToBackupFSM - ReleaseActivity;<br>SignalToXlsp - Flood LSP;<br>SignalToDp - Clear FwdToMate for PrimarySubscriptions 174; |

TABLE 15-continued

SignalToDp - Activate Primary XVRID 106;
SignalToXsmp - Treat mate XVRID 116 as a normal router
SignalToXsmp - Flood SU Summary

| Event | Action | Next State or Choicepoint |
|---|---|---|
| XLSP-MateLinkUp | None | PrimaryShutdown 138 |
| XLSP-MateLinkDown | None | PrimaryShutdown 138 |
| Timeout | None | PrimaryShutdown 138 |
| VRRP-LocalActive | None | PrimaryShutdown 138 |
| VRRP-RemoteActive | None | PrimaryShutdown 138 |
| XLSP-LocalActive | None | PrimaryShutdown 138 |
| XLSP-RemoteActive | None | PrimaryShutdown 138 |
| Mgmt-ReleaseActivity | Return ERROR-RedundancyIsShutdown | PrimaryShutdown 138 |
| Mgmt-NoReleaseActivity | None | PrimaryShutdown 138 |
| Mgmt-Shutdown | None | PrimaryShutdown 138 |
| Mgmt-NoShutdown | Clear ShutdownFlag 120 in persistent store 93; SignalToXsmp - Treat mate XVRID 116 as mate router SignalToBackupFsm - NoReleaseActivity | CP-IsMateLinkUp 140 |
| XSMP-DsdbXsdbSynced | None | PrimaryShutdown 138 |
| Exit Actions: | PrimaryPriority = PrimaryActive | |

Figure 9:
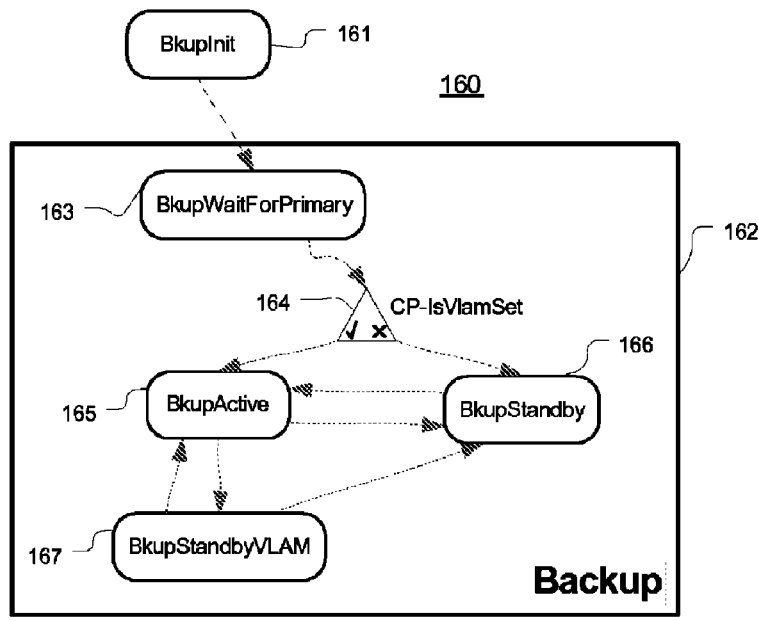
FIG. 9 shows the backup finite state machine.

FIG. 9 shows the parent states, child states and choice points (CP) that comprise the backup FSM 160. The FSM is comprised of parent states BkupInit 161 and Backup 162. The backup FSM 160 handles the activity state for the backup XVRID 116, and is a slave to the primary FSM 130. The backup FSM 160 waits until the primary FSM 130 has had a chance to initialize and synchronize with the mate router. Once that initialization is complete, the backup FSM 160 will only ever attempt to assert activity for the backup XVRID 116 if VRRP indicates that the local router should assert activity for the backup virtual-router-ID. Even in this scenario, if XLSP "pushes back" and indicates that another router in the network is asserting activity for that XVRID (ie. advertising the XVRID with a higher priority), the backup FSM 160 will immediately relinquish activity, regardless of the VRRP status.

The BkupInit parent state 161 is the starting point of the backup FSM 160. It has no child states, and it simply proceeds once initialized to state BkupWaitForPrimary 163.

The Backup parent state 162 consists of child states BkupWaitForPrimary 163, BkupActive 165, BkupStandby 166 and BkupStandbyVLAM 167. BkupWaitForPrimary 163 is active when the backup FSM 160 is waiting for the primary FSM 130 to be ready. BkupActive 165 is active when this router is active on behalf of the mate router for the mate XVRID 116. The state BkupStandby 166 is active when the mate router is active for the mate XVRID 116. The state BkupStandbyVLAM is active when the mate router is active for the mate XVRID 116, and the VRRP protocol is indicating that this router should be active for the mate XVRID but the XLSP protocol is indicating that the mate router should be active for the mate XVRID (i.e. XLSP takes precedence).

Table 16 below explains the events that are processed by the backup FSM 160.

TABLE 16

| Event | Description |
|---|---|
| FSM Initialized | The FSM has been activated to run. Only applies to the Init state 161. |
| Timeout | A timer that has been started in the state has expired. Unless otherwise indicated, all times are started with duration of 10 seconds. |
| VRRP-LocalActiveForMate | The VRRP protocol (refer to RFC 3768) has determined that the local router (the one running the backup FSM in question) has been elected as active for the virtual router normally owned by the mate router, i.e. this router should be acting on behalf of the mate router according to VRRP. |
| VRRP-RemoteActiveForMate | The VRRP protocol has determined that the mate router has been elected as active for the virtual router that it normally owns. |
| XLSP-LocalActiveForMate | The XLSP protocol (refer to 5,473,59) has determined that the local router (the one running the backup FSM in question) has been elected as active for the virtual router normally owned by the mate router, i.e. this router should acting on behalf of the mate router. |
| XLSP-RemoteActiveForMate | The XLSP protocol has determined that the mate router has been elected as active for the virtual router that it normally owns. |

TABLE 16-continued

| Event | Description |
|---|---|
| PrimaryFSM-ReleaseActivity | An event generated by the primary FSM 130 to the backup FSM 160 indicating that the router has been configured by a management command to not be active. |
| PrimaryFSM-NoReleaseActivity | An event generated by the primary FSM 130 to the backup FSM 160 indicating that the router has no longer been configured by a management command to not be active. |
| PrimaryFSM-Ready | An event generated by the primary FSM 130 to the backup FSM 160 indicating that the primary FSM 130 is ready. |

Some of the actions in the backup FSM 160 involve signaling information to other subsystems in the router. These are detailed in Table 17 below. Note that some of the actions carried out by the backup FSM 160 are the same as for the primary FSM 130, and have already been explained in Table 3 above and are not shown in Table 17.

TABLE 17

| Action | Description |
|---|---|
| SignalToDp - Set FwdToMate for Backup Subscriptions 179 | This tells the dataplane (DP) subsystem that backup subscriptions (i.e. those received for subscribers that are normally served by the mate router) should be treated as if they belong to the mate router. This is done when the mate router is responsible for handling its own subscribers and subscriptions. |
| SignalToDp - Clear FwdToMate for Backup Subscriptions 179 | This tells the dataplane subsystem that backup subscriptions should be treated as if they belong to this router. This is done when this router is responsible for handling the backup subscribers and subscriptions. |
| SignalToDp - Activate backup XVRID 116 | This tells the dataplane subsystem that it should terminate traffic addressed to the backup XVRID 116, i.e. the dataplane is the active user of the backup XVRID 116 address. This means that this router will process traffic addressed to the backup XVRID 116. |
| SignalToDp - Deactivate backup XVRID 116 | This tells the dataplane subsystem that is should not terminate traffic addressed to the backup XVRID 116. |

Table 18 below specifies the logic for the BkupInit state 161.

TABLE 18

| STATE: BkupInit 161 | | PARENT STATE: None |
|---|---|---|
| Entry Actions: | None | |
| Event | Action | Next State or Choicepoint |
| FSM Initialised | None | BkupWaitForPrimary 163 |
| Exit Actions: | None | |

Table 19 below specifies the logic for the parent state Backup 162.

TABLE 19

| STATE: Backup 162 | | PARENT STATE: None |
|---|---|---|
| Entry Actions: | None | |
| Event | Action | Next State or Choicepoint |
| Timeout | None | Backup 162 |
| VRRP-LocalActiveForMate | Set VLAM flag 178 | Backup 162 |

TABLE 19-continued

| | | |
|---|---|---|
| VRRP-RemoteActiveForMate | Clear VLAM flag 178 | Backup 162 |
| XLSP-LocalActiveForMate | None | Backup 162 |
| XLSP-RemoteActiveForMate | None | Backup 162 |
| PrimaryFSM-ReleaseActivity | None | BkupWaitForPrimary 163 |
| PrimaryFSM-NoReleaseActivity | None | Backup 162 |
| PrimaryFSM-Ready | None | Backup 162 |
| Exit Actions: | None | |

Table 20 below specifies the logic for the child state BkupWaitForPrimary 163.

TABLE 20

| STATE: BkupWaitForPrimary 163 | PARENT STATE: Backup 162 |
|---|---|
| Entry Actions: | if (ShutdownFlag 120 or ReleaseActivityFlag 121 set in persistent store 93)<br>{<br>   BackupPriority 176 = ReleaseActivity;<br>}<br>else<br>{<br>   BackupPriority 176 = BackupReconcile;<br>}<br>SignalToXlsp - Flood LSP<br>SignalToDp - Set FwdToMate for Backup Subscriptions 179;<br>SignalToDp - Deactivate Backup XVRID 116; |

| Event | Action | Next State or Choicepoint |
|---|---|---|
| Timeout | Parent | |
| VRRP-LocalActiveForMate | Parent | |
| VRRP-RemoteActiveForMate | Parent | |
| XLSP-LocalActiveForMate | Parent | |
| XLSP-RemoteActiveForMate | Parent | |
| PrimaryFSM-ReleaseActivity | BackupPriority 176 = ReleaseActivity;<br>SignalToXlsp - Flood LSP | BkupWaitForPrimary 163 |
| PrimaryFSM-NoReleaseActivity | BackupPriority 176 = BackupReconcile;<br>SignalToXlsp - Flood LSP | BkupWaitForPrimary 163 |
| PrimaryFSM-Ready | BackupPriority 176 = Backup;<br>SignalToXlsp - Flood LSP; | CP-IsVlamSet 164 |

| Exit Actions: | None |
|---|---|

Table 21 below specifies the logic for the child state BkupActive 165.

TABLE 21

| STATE: BkupActive 165 | PARENT STATE: Backup 162 |
|---|---|
| Entry Actions: | BackupPriority 176 = BackupAssertActivity;<br>Start Timer;<br>SignalToXlsp - Flood LSP;<br>SignalToDp - Clear FwdToMate for Backup Subscriptions 179;<br>SignalToDp - Activate Backup XVRID 116; |

| Event | Action | Next State or Choicepoint |
|---|---|---|
| Timeout | BackupPriority 176 = Backup;<br>SignalToXlsp - Flood LSP; | BkupActive 165 |
| VRRP-LocalActiveForMate | Parent | |
| VRRP-RemoteActiveForMate | if (BackupPriority 176 > Backup)<br>{<br>   BackupPriority 176 = Backup;<br>   SignalToXlsp - Flood LSP;<br>}<br>Clear VLAM flag 178 | BkupStandby 166 |
| XLSP-LocalActiveForMate | Parent | |
| XLSP-RemoteActiveForMate | if (BackupPriority 176 > Backup)<br>{<br>   BackupPriority 176 = Backup;<br>   SignalToXlsp - Flood LSP;<br>} | BkupStandbyVLAM 167 |
| PrimaryFSM-ReleaseActivity | Parent | |
| PrimaryFSM-NoReleaseActivity | Parent | |
| PrimaryFSM-Ready | Parent | |

| Exit Actions: | Stop Timer; |
|---|---|

Table 22 below specifies the logic for the child state BkupStandby 166.

TABLE 22

| STATE: BkupStandby 166 | PARENT STATE: Backup 162 | |
|---|---|---|
| Entry Actions: | SignalToDp - Set FwdToMate for Backup Subscriptions 179; SignalToDp - Deactivate Backup XVRID 116; | |
| Event | Action | Next State or Choicepoint |
| Timeout | Parent | |
| VRRP-LocalActiveForMate | Set VLAM flag 178 | BkupActive 165 |
| VRRP-RemoteActiveForMate | Parent | |
| XLSP-LocalActiveForMate | Parent | |
| XLSP-RemoteActiveForMate | Parent | |
| PrimaryFSM-ReleaseActivity | Parent | |
| PrimaryFSM-NoReleaseActivity | Parent | |
| PrimaryFSM-Ready | Parent | |
| Exit Actions: | None | |

Table 23 below specifies the logic for the child state BkupStandbyVLAM 167.

TABLE 23

| STATE: BkupStandby VLAM 167 | PARENT STATE: Backup 162 | |
|---|---|---|
| Entry Actions: | SignalToDp - Set FwdToMate for Backup Subscriptions 179; SignalToDp - Deactivate Backup XVRID 116; | |
| Event | Action | Next State or Choicepoint |
| Timeout | Parent | |
| VRRP-LocalActiveForMate | Parent | |
| VRRP-RemoteActiveForMate | Clear VLAM flag 178 | BkupStandby 166 |
| XLSP-LocalActiveForMate | None | BkupActive 165 |
| XLSP-RemoteActiveForMate | Parent | |
| PrimaryFSM-ReleaseActivity | Parent | |
| PrimaryFSM-NoReleaseActivity | Parent | |
| PrimaryFSM-Ready | Parent | |
| Exit Actions: | None | |

Table 24 below specifies the logic for the choicepoint CP-IsVlamSet 164.

TABLE 24

| CHOICE: CP-IsVlamSet 164 | | |
|---|---|---|
| Test: | (Is VLAM flag 178 set)? | |
| Result | Action | Next State or Choicepoint |
| True | None | BkupActive 165 |
| False | None | BkupStandby 166 |

The XLSP protocol, as disclosed in U.S. patent application Ser. No. 11/012,113, had been modified to support the redundancy capability of this invention. XLSP is extended to allow a router to advertise the virtual routers it can support, along with its priority (see Table 2 above) for each virtual router, through an extension to the Link State Packet (LSP). This is shown in Table 25 below, with the "virtualRouter" entry being new.

TABLE 25

| Link State Packet | |
|---|---|
| Field | Description |
| requestId | Sequential request identifier |
| senderId | The sending router's unique id |
| sourceId | The router's unique id for which the packet originated |
| sequenceNumber | The sequence number corresponding source's link state DB |

TABLE 25-continued

Link State Packet

| Field | Description |
|---|---|
| linkCost | The neighbouring router's unique id along with the link's cost, i.e. a (routerId, cost) tuple. There is one such entry for each link being described. This tuple can be extended to carry other attributes for each link, examples of which were described above. |
| virtualRouter | The XSMP virtual router ID (XVRID) of the sourceId router, along with the current priority of the virtual router, i.e. a (XVRID, priority) tuple. When multiple routers advertise the same XVRID, XLSP chooses the router with the highest priority (0=lowest, 255=highest) to be the "active" XSMP router for that XVRID. There is one such entry for each virtual router being described. When redundancy has not been configured, there will be a single virtual router present. When redundancy has been enabled, there will be two or more virtual routers present. |

For example, referring to FIG. 4, router 71 will emit an LSP as per Table 25 above, and in that LSP it will indicate its priority for the virtual router representing IP "A" (which is the PrimaryPriority 173 for router 71) and its priority for the virtual router representing IP "B" (which is the BackupPriority 176 for virtual router 71). Likewise, router 72 will emit an LSP as per Table 25 above indicating its priority for each of the two virtual routers. This allows routers in network 82 to determine which router is active for a given XVRID by simply examining the priority for that XVRID advertised by different routers (such as 71 and 72) and choosing the router with the highest priority.

Figure 10:
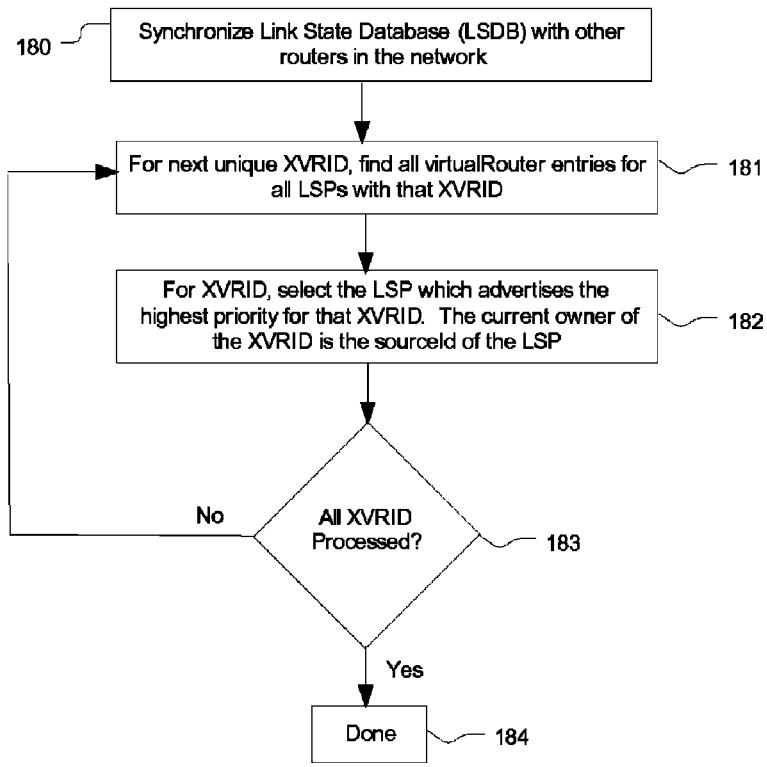
FIG. 10 shows the XLSP logic for determining the active router for an XVRID.

FIG. 10 shows the logic of how XLSP can determine which router is active for each XVRID in the network. Starting at step 180, the XLSP Link State Database (LSDB) is synchronized as per Ser. No. 11/012,113, using the modified LSP defined in Table 25 above. Then, at step 181, the next XVRID is selected from among those reported in all LSPs, and all virtualRouter entries referencing this XVRID are collected. At step 182, for the current XVRID, the priority of each (XVRID, priority) tuple for this XVRID are examined, and the one with the highest priority is selected. The LSP with this entry thus indicates the current owner of this XVRID from the sourceId field of the LSP. At step 183, a check is made to see if all unique XVRIDs have been processed. If so, control reaches step 184 and the process is complete. Otherwise, control reaches step 181 again. Upon completion of this process by a given router in the network, the router knows which physical router is currently active for a given XVRID.

When a content router receives a published document or message, it will match the content subscriptions against the document/message, and determine the set of XVRIDs which require the document/message. Then, using the information computed above by XLSP, the content router maps each XVRID to the address of the physical router which is currently active for each XVRID. The document/message will then be addressed to the set of physical routerIds which require the document/message. Thus, a content router can map subscriptions based on the XVRID to the correct physical address currently serving that XVRID as the active router for an XVRID changes from one physical router to another.

Note that for XLSP, XLSP adjacencies (such as 80 and 81) are configured against the physical IP address of the router to talk to. The source addresses in XLSP messages (e.g. senderId and sourceId in the LSP of Table 25 above) also use the router physical address. Only the XVRID field in the LSP reflects the virtual address that can move between routers. In this way, XLSP allows the routers to dynamically learn about the binding of XVRIDs to physical routers. As this information changes, a router will re-emit a newer version of its LSP, and after receiving such an LSP, the algorithm of FIG. 10 is re-run to determine the new bindings of XVRIDs to physical routers in the network. Note that when an updated LSP is received, as an optimization, only the XVRIDs referenced in the new version of the LSP or the old version of the LSP need to be processed (i.e. an XVRID may be present in the old version of the LSP and not in the new version, or present in the new version and not in the old version, or present in both and with the same or different priority).

The XSMP protocol, as disclosed in Ser. No. 11/012,113, had been modified to support the redundancy capability of this invention. With reference to FIG. 4, router 71 has the detailed subscription information (not summarized) for each of its primary subscribers 70A. As disclosed in Ser. No. 11/102,113, router 71 would also have a covering set for each other router in network 82, including router 72. However, with this invention, router 71 now has the detailed subscription information for each of the subscribers 70B of router 72 (the mate router) instead of a covering set of such subscriptions. However, router 71 still has a covering set for each other router 83. Similarly, router 72 has the details of subscriptions for each of its primary subscribers 70B, details of subscriptions for each of its backup subscribers 70A (who are normally served by router 71), and a covering set for each other content router 83.

When a content router 71 has the detailed subscription information for the mate router 72, it can determine whether or not the mate router needs a message which has been published to router 71 in the same manner as if it had the covering set information for router 72 instead. However, if router 71 needs to take over control of IP "B" for router 72, router 71 has the detailed subscriber and subscription information for subscribers 70B and can service those subscribers.

A new message type is introduced into the XSMP message suite to allow a content router to update direct subscription information (from attached subscribers) to the mate router.

The Active-Active Subscription Update Request (AASU) message is shown in Table 26 below, and the Active-Active Subscription Update Response (AASUResp) is shown in Table 27 below. The AASUResp is sent in response to a received AASU. These messages are very similar to the SU and SUResp messages disclosed in U.S. patent application Ser. No. 11/012,113.

TABLE 26

Active-Active Subscription Update Request (AASU)

| Field | Description |
|---|---|
| senderId | The sending router's id |
| subscriberId | The XVRID of the router for which the update applies |
| dsdbFirstSeqNum | The sequence number of the first packet in the DSDB for the XVRID |
| dsdbLastSeqNum | The sequence number of the last packet in the DSDB for the XVRID |
| dsdbCurrentSeqNum | The sequence number of the last packet that was added to the DSDB for the XVRID (may have subsequently been removed) |
| dsdbNumEntries | The number of packets in the DSDB for the XVRID |
| dsdbLastReconciledSeqNum | The sequence number of the last packet that was successfully propagated from the active router's DSDB to the standby router's DSDB |
| csdbCurrentSeqNum | The sequence number of the last packet that was added to the CSDB for the XVRID (may have subsequently been removed) |
| xsdbKey | A string which is used to uniquely identify the XSDB database for the XVRID. This string is only changed when the XSDB on a router is erased (e.g. on a restart of the router), and is used by other routers to determine whether the XSDB and DSDB they may have for the XVRID is still valid. |
| sequence | There is one sequence entry for each block of contiguous sequence numbers that exist in the DSDB. This allows a router to report the sequence numbers that is has in use. Each sequence entry consists of the tuple (seqNum, prevSeqNum), where seqNum is the first sequence number if a contiguous block of packets in the DSDB, and prevSeqNum is the sequence number of the preceding packet (i.e. the end of the previous contiguous block of packets) in the DSDB. |
| dsdbPacketList | A list of packets, which can be a mix of dsdbSubscriberPackets (used to describe a subscriber) and dsdbSubscriptionPackets (used to describe a subscription for a subscriber). The dsdbSubscriberPacket is a tuple consisting of (dsdbSeqNum, dsdbPrevSeqNum, subscriber, address), where dsdbSeqNum is the sequence number for this packet, dsdbPrevSeqNum is the sequence number for the preceding DSDB packet, subscriber is the name (or other unique identifier) of the subscriber, and address is the address of the subscriber. Other fields can be added as necessary to describe the subscriber. The dsdbSubscriptionPacket is a tuple consisting of (dsdbSeqNum, dsdbPrevSeqNum, subscriber, namespacePacket(s), subscriptionPacket), where where dsdbSeqNum is the sequence number for this packet, dsdbPrevSeqNum is the sequence number for the preceding DSDB packet, subscriber is the name (or other unique identifier) of the subscriber, namepacePacket is one or more namespace packets described below, and subscriptionPacket is a tuple described below. The dsdbSubscriptionPacket can be augmented with other information needed to describe the subscription. The namespacePacket is a tuple that describes the mapping of a namespace prefix to a namespace string, and has a corresponding XSDB sequence number and previous sequence number. This allows a namespace in the DSDB to be mapped to a namespace entry in the XSDB. The subscriptionPacket is a tuple which provides an XPath Expression (XPE) for the subscription, whether or not the subscription is a filter, along with a corresponding XSDB sequence number and a previous sequence number. This allows a subscription packet to be mapped to a corresponding subscription packet in the XSDB. Due to covering sets, many subscriptions in the DSDB can map to the same subscription in the XSDB. The XPE may reference previously-defined namespace prefixes. |

TABLE 27

Active-Active Subscription Update Response (AASUResp)

| Field | Description |
|---|---|
| senderId | The responding router's id |
| isOk | Boolean value indicating whether the update packets were all processed successfully or not |
| subscriberID | The XVRID for which the response is being sent. |
| dsdbCurentSequenceNumber | The sequence number of the last packet that was added to the DSDB (may have subsequently been removed). |

Figure 11:
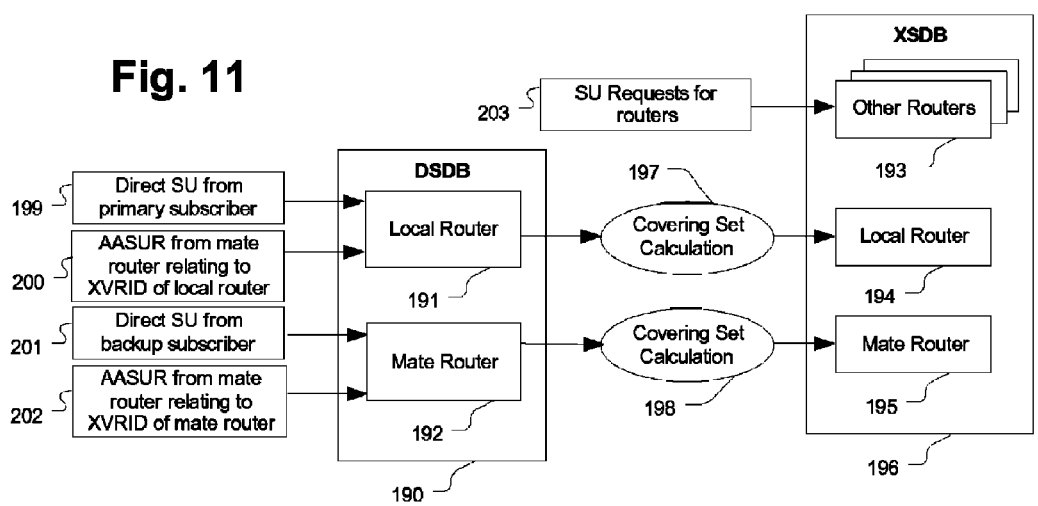
FIG. 11 shows subscription storage in a router.

FIG. 11 shows the subscription storage in a router, along with modifications made to the XSDB disclosed in Ser. No. 11/102,113. The XSDB 196 has a row for each router in the network, but the rows are indexed by XVRID instead of by physical router ID. In this way, as the physical owner of a given XVRID changes due to a redundancy switchover, the contents of the XSDB are not affected. The XSDB has a row 194 for the local router, a row 195 for the mate router (if any), and rows 193 for other routers in the network 82. For routers other than the local or mate router, the XSDB rows 193 are updated in the manner described in Ser. No. 11/102,113, through SU requests received 203.

There exists a Direct Subscription Database (DSDB) 190 to hold more detailed information about direct subscribers and direct subscriptions. The DSDB 190 consists of a repository 191 for the local router, and a repository 192 for the mate router. The local repository 191 contains information related to the primary XVRID 106, while the mate repository 192 contains information related to the mate XVRID 116.

The local repository 191 can be updated from two sources. The first source 199 is subscription update messages received from primary subscribers when the router is active for the primary XVRID. This is the normal source of updates. The second source 200 is AASUR messages from the mate router relating to subscription updates received by the mate router when it was acting on behalf of this routers primary XVRID (i.e. while this router was unavailable).

The mate repository 192 can be updated from two sources. The first source 201 is subscription update messages received from backup subscribers when the router is active for the mate XVRID (i.e. the mate router was unavailable to serve its primary subscribers which are this router's backup subscribers). The second source 202 is AASUR messages from the mate router relating to subscription updates received by the mate router for its primary subscribers (which are this router's backup subscribers).

The XSDB row 194 for the local router is created by the covering set calculation 197 across the subscriptions in the local repository 191. The XSDB row 195 for the mate router is created by the covering set calculation 198 across the subscriptions in the mate repository 192. The concept of a covering set was explained in Ser. No. 11/012,113.

A router undertaking active-active redundancy only synchronizes its XSDB rows 193 directly for routers that are not mate routers. For a router it is backing up (the mate router), a router instead synchronizes the DSDB row 192 for that router, and then uses DSDB information 192 to populate the XSDB row 195 for the mate router. Additionally, a router will only accept an XSDB update from a physical router for a given XVRID if it considers that physical router to be "active" for that XVRID, as determined by the algorithm used by XLSP described above. This rule ensures that the network converges upon the active router's view of the XSMP subscriptions.

A number of XSMP messages disclosed in Ser. No. 11/012, 113 are modified slightly to allow for the capability to allow efficient router redundancy.

The Register XSMP Node Request (RegNode) message is extended to include information about the virtual router configuration of the node. This allows neighboring routers to verify the consistency of active-active redundancy between them. The extended message format is shown in Table 28 below.

TABLE 28

Register XSMP Node Request (RegNode)

| Field | Description |
| --- | --- |
| senderId | The sending endpoint's unique id |
| xsmpVersion | The version of XSMP spoken by the router in the form <major>.<minor> (where <major> and <minor> are integers). A difference in minor version number indicates a backwards-compatible protocol change (typically this implies new XSMP message elements that can safely be ignored by the older protocol version). A difference in major version number indicates a non-backwards compatible change; a router, when receiving a RegNode with a major version number lower than its own must either revert to sending only messages that are supported by the lower version number, or must stop participating in the handshake with the older router. In the case of a major version mismatch where the receiver is the mate router of the sender (in an active-active redundancy pair), the router must stop participating in the handshake, and must not act as a backup router for the mate |
| virtualRouter | There is one virtualRouter entry for each virtual router supported by the sending router being described, with each entry being a tuple containing (nodeId, ownerId, vrrpVrId). nodeId is the XVRID of the virtual router, ownerId is the id of the router that owns the XVRID, and vrrpVrId is the VRRP VRID in use for that virtual router as per RFC 3768. This information allows the mate router to verify that the active-active redundancy configuration is consistent between the two routers, so that it may refuse to establish the XSMP link if an inconsistency is encountered. |
| xsmpNodeInfo | There is one xsmpNodeInfo entry for each well-known XSMP node being listed. Each entry is a tuple consisting of (nodeId, xsmpVersion). nodeId is the unique ID of the XSMP node, and version is as described above. |

A new message, the XML Direct Subscription Database Description Request (XDSDD) message has been added, which is used to describe rows in the DSDB 190. In addition, the "nodeId" field in the both the existing XSDD message, and the new XDSDD message, is modified to contain the XVRID instead of a physical node ID. This is a key element that allows the XSDB and DSDB row to be mapped to different physical routers due to redundancy switches.

TABLE 29

XML Subscription Database Description Request (XSDD)

| Field | Description |
| --- | --- |
| senderId | The sending router's id |
| nodeId | The XVRID of the DSDB row being described by this XDSDD message |
| dsdbFirstSeqNum | The sequence number of the first packet in the DSDB row for the nodeId. |
| dsdLastSeqNum | The sequence number of the last packet in the DSDB row for the nodeId |
| dsdbCurrentSeqNum | The sequence number of the last packet that was added to the DSDB row (may have subsequently been removed) |

TABLE 29-continued

XML Subscription Database Description Request (XSDD)

| Field | Description |
| --- | --- |
| dsdbNumEntries | The number of packets in the XSDB row |
| xsdbKey | A string used to uniquely identify the XSDB for the XVRID. This string is only changed when the database on a router is erased, and is used by other routers to determine whether the XSDB and DSDB row they may have for the XVRID is still valid |

The XML Subscription Request (XSR) message has been extended to allow the contents of the DSDB of a node to be requested. The extended XSR message is shown in Table 30 below.

TABLE 30

XML Subscription Request (XSR)

| Field | Description |
| --- | --- |
| senderId | The sending router's id |
| reqNodeInfo | Boolean flag indicating interest in node information (i.e. true to request the recipient to send RegNode) |
| reqXsdd | Boolean flag indicating interest in a node's XSDD (i.e. true to request the recipient to send XSDD) |
| req Xdsdd | Boolean flag indicating interest in a node's XDSDD (i.e. true to request the recipient to send XDSDD) |
| XsmpUpdateRequest | There is one XsmpUpdateRequest entry for each update range being requested. Each XsmpUpdateRequest entry is a tuple of (nodeId, reqSeqList, firstSeqNum, lastSeqNum). nodeId is the XVRID whose XSDB row is being requested. reqSeqList is a boolean flag indicating interest in a list of (seq#, prev seq #) elements, which represent the contiguous blocks of packets in the peer's database. firstSeqNum is the sequence number of the first packet being requested. lastSeqNum is the sequence number of the last packet being requested. |
| DsdbUpdateRequest | There is one DsdbUpdateRequest entry for each update range being requested. Each DsdbUpdateRequest entry is a tuple of (nodeId, reqSeqList, firstSeqNum, lastSeqNum). nodeId is the physical router ID whose DSDB row is being requested. The other entries have the same meaning as described above. |

Prior to this invention, the XSMP protocol always used physical router IDs for all addressing in XSMP messaging. With redundancy, there is a mix of the use of physical router IDs and XVRIDs in the XSMP messaging. The use of each is shown in Table 31 below. In table 31, "destination" refers to the router being in the destination address list of the XSMP message. For XSR destination, router ID is used for neighbor registration, and between a router and its mate router; XVRID is used for node registration, and for requests following neighbor/node registration between routers that are not an active-active pair. Note that at the TCP/IP layer between routers, XSMP messages are always addressed and sent to the next hop physical router, regardless whether the final destination is a physical or a virtual address. A router determines the mapping from a virtual address to a physical address using the information computed by XLSP as described above.

TABLE 31

| Message Type | senderId | destination | nodeId | subscriberId |
| --- | --- | --- | --- | --- |
| RegNode | Router ID | Router ID | XVRID | Not applicable |
| XSDD | Router ID | Router ID | XVRID | Not applicable |
| XSR | Router ID | Router ID/ XVRID | XVRID | Not applicable |
| SU (router to router) | Router ID | Router ID | Not applicable | XVRID |
| SU (subscriber to router) | Subscriber IP address | XVRID | Not applicable | Subscriber IP address |
| AASU | Router ID | Router ID | Not applicable | Subscriber IP address |

With reference to FIG. 4, assume router 71 is currently active for virtual router "A", and router 72 is currently active for virtual router "B", i.e. each router is currently active for the XVRID that it owns. When a subscriber 70A adds a subscription (with the SU request addressed to the XVRID of virtual router "A" as per Table 31 above), router 71 carries out the steps detailed in FIG. 12. The process starts at step 219 where an SU message is received from the subscriber. At step 220, a check is made to see if the SU message contains any errors. If so, step 227 is reached and an SU response is sent to the subscriber indicating failure, and the process completes at steps 228. Otherwise, at step 221 the DSDB row 191 and XSDB row 194 (through covering set logic 197) is updated with the changes from the received SU (such as subscription and filter additions or removals). Any updates made to the XSDB row 1945 cause XSMP to send updates to routers in the network to update their view of the covering set. Note that the mate router does not use such updates since it wants the detailed subscription view from its mate router, not the covering set view. At step 222, a check is made to see if the XSMP link 80 to the mate router is up. If, not, step 225 is reached, and an SU response is sent to the subscriber indicating success, and then step 228 is reached and the process is completed. Note that in this scenario, when the XSMP link comes up between the router and the mate router, the XSMP database synchronization will take care of synchronizing the XSDB and the DSDB, including this latest update. At step 222, if the XSMP link to the mate router is up, then one or more AASU messages are sent to the mate router to indicate the changes to the DSDB row 191. Note that as described above, the AASU contains both DSDB and XSDB sequence numbers. More than one message is needed only if the router wishes to impose a limit on the size of a given AASU message; otherwise a single message can be sent to reflect all changes. At step 224, a check is made to see if all AASU responses from the mate router (in response to step 223) indicate success. If so, step 225 is reached, and an SU response is sent to the subscriber indicating success, and the process completes at step 228. At step 224, if the mate router indicates that it could not process the AASU, then at step 226 the changes made to the DSDB as a result of the received SU are rolled back. This may also involve sending an AASU to the mate router to reflect the roll-back made (since multiple AASU may have been previously sent, and some may have succeeded and some failed). At step 227, an SU response is sent to the subscriber indicating failure, and the process completes at step 228. It should be noted that in a properly engineered network, it is not expected that a standby router would ever reject a subscription that was accepted by an active router. The only situation where such an event could occur would be a network condition in which the total subscription capacity of the routers has been exceeded on one of the standby routers, but has not yet been exceeded on the active router. In such a scenario, it is preferable to reject that subscription on all the routers, rather than allowing a subscription database inconsistency to persist between the active and the standby routers.

As described above, when the mate router 72 receives the AASU messages as a result of step 223, it updates row 192 in its DSDB and row 195 in its XSDB. Since the AASU message carries both the DSDB and XSDB sequence numbers of the subscriptions that are being advertised, the DSDB and XSDB updates that are performed on the standby router, as a result of receiving the AASU message, are identical to the updates that were performed by the active router, and identical sequence numbers are used on the primary and the standby routers.

Figure 12:
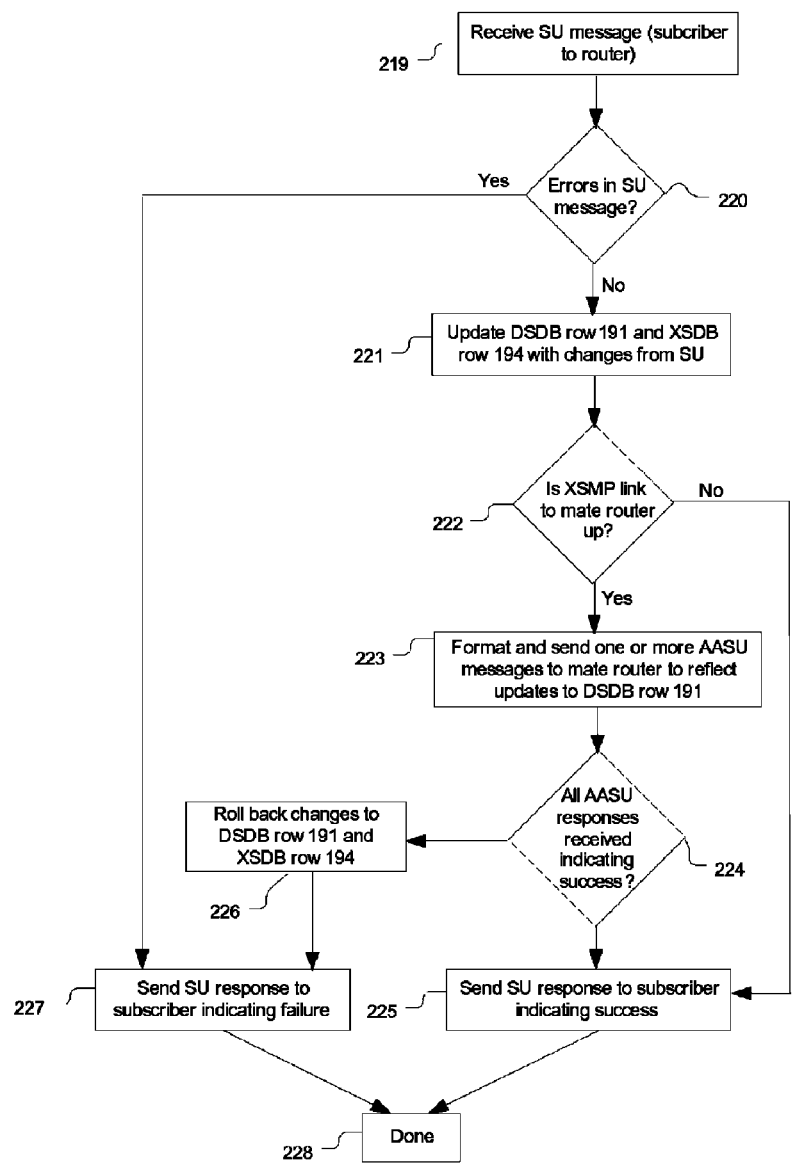
FIG. 12 shows processing steps for a received SU message for an XVRID which is owned.

As an option to the process of FIG. 12, router 71 could always indicate success to the subscriber and keep the changes in its DSDB row 191 even if the mate router could not process the AASU messages. However, the two router's DSDBs are now out of synchronization. If router 72 takes over activity from router 71, the latest changes to the subscriptions for subscriber 70A are not properly reflected in the DSDB row 192 of router 72. This can be reconciled by a router undertaking an audit of its subscriptions with each subscriber it is serving after it becomes active, and the missing subscription updates will be detected and corrected at that time.

Figure 13:
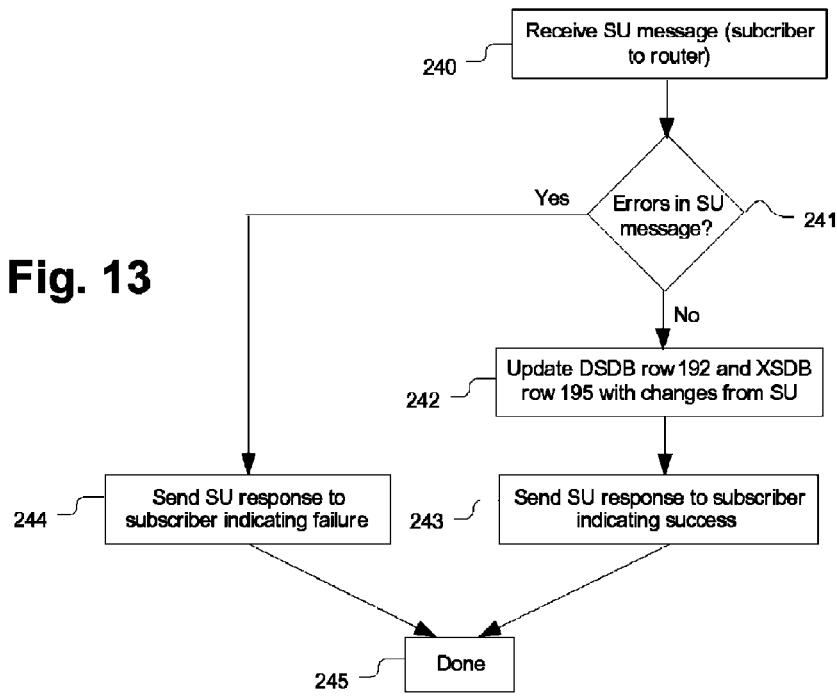
FIG. 13 shows processing steps on the backup router for a received SU message for an XVRID which is not owned.

If router 72 takes over activity for virtual router "A", it will now process SU messages from subscribers 70A for changes to subscriptions. FIG. 13 shows the processing that is carried out when a router which is active for a XVRID which it does not own processes a received SU message. The process starts at step 240, where an SU message is received from the subscriber. At step 241, a check is made to see if the SU message contains any errors. If so, step 244 is reached and an SU response is sent to the subscriber indicating failure, and the process completes at steps 245. Otherwise, at step 242 the DSDB row 192 and XSDB row 195 is updated with the changes from the received SU (such as subscription and filter additions or removals). Since router 72 is active for the virtual router "A", it also sends XSMP updates to reflect any changes to the XSDB row. At step 243, an SU response is sent to the subscriber indicating success, and the process completes at step 245. Note that when router 72 is active for the virtual router "A", it is the one doing the sequence number assignment, instead of router 71 which normally does the sequence number assignment.

When router 71 becomes available again, router 72 will synchronize its DSDB with router 71, and propagate to router 71 any subscription changes for subscribers 70A that router 72 may have processed. Once this XSMP synchronization is complete and router 71's DSDB and XSDB is up-to-date, router 71 again asserts control of virtual router "A" as per the primary FSM 73 described earlier.

Another rare situation that can occur is when network 82 becomes partitioned, such that router 71 and router 72 are both operational but cannot communicate with each other either through LAN 77 or through adjacency 80 or through the rest of the network 83. In this situation, it could be that some of the subscribers 70A can reach router 71, while others of the subscribers 70A can reach router 72. Due to a complete lack of communication ability between the two routers, both routers will assert activity for virtual router "A" (and for virtual router "B"). As a result, router 71 will be accepting subscription changes (adds and removes) from a subset of subscribers 70A and updating its DSDB row 191 and XSDB row 194, and router 72 will be accepting subscription changes (adds and removes) from a subset of subscribers 70A and updating its DSDB row 191 and XSDB row 194. Additionally, they can be allocating the same sequence numbers.

Figure 14:
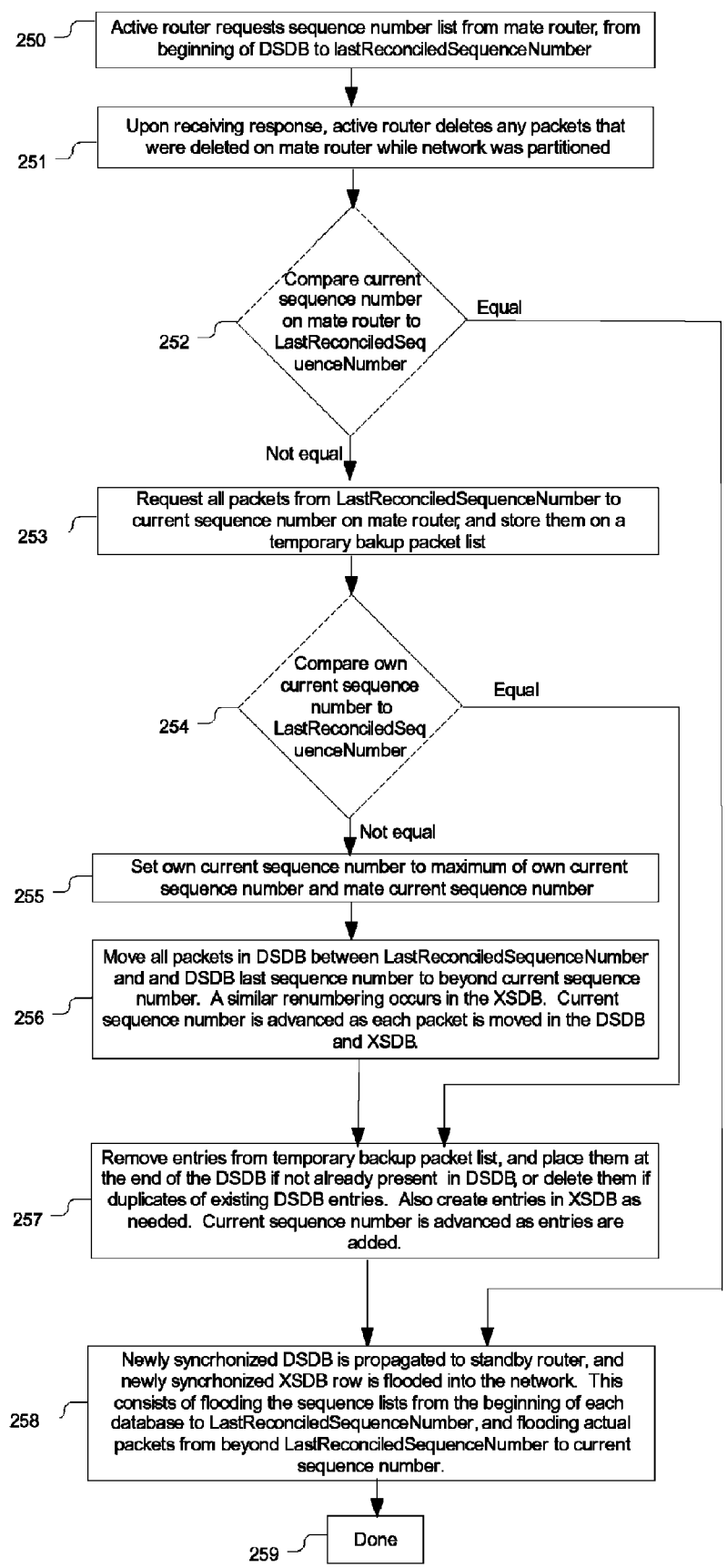
FIG. 14 shows the processing steps for reconciliation of subscription information.

When the two routers can again communicate, the primary owner of the virtual router will remain active, since it was already active and it will assert a higher priority than the backup router. The backup router will no longer be active for the virtual router. The process of reconciling the subscription information will then occur as shown in FIG. 14. These steps are carried out by the active router. To determine what needs to be reconciled, the routers make use of a "LastReconciledSequenceNumber", which is the value of the "current DSDB sequence number" that was successfully propagated from the active router to the standby router before the network was partitioned.

The reconciliation process starts with step 250, in which the active router requests the sequence number list from the mate router, from the beginning of the DSDB to the LastReconciledSequenceNumber. At step 251, once the requested information is received from the mate router, the active router deletes any packets (in both the DSDB and the XSDB) that were deleted on the mate router while the network was partitioned. For example, if the active router has sequence numbers 1 through 10, and the mate router reports sequence numbers 1 through 6 and 8 through 10, then the packet with sequence number 7 needs to be deleted since it was deleted by the mate router.

At step 252, the current sequence number on the mate router is compared with the LastReconciledSequenceNumber. If they are equal, then control proceeds to step 258, and otherwise step 253 is reached. A non-equal condition means that the mate router added new information to its DSDB while the network was partitioned. At step 253, the active router requests all packets from LastReconciledSequenceNumber to current sequence number on the mate router (i.e. all the packets that the mate router added), and stores them on a temporary backup packet list, and then step 254 is reached. Note that as an optimization, this step can be done in parallel with the request made in step 251.

At step 254, a comparison is made between the active router's own current sequence number and LastReconciledSequenceNumber. If they are equal, control reaches step 257. An equal condition means that the active router did not add any new entries to its DSDB while the network was partitioned. If the numbers are not equal, step 255 is reached.

At step 255, the active router sets is own current sequence number to the maximum of its own current sequence number and the mate's current sequence number. At step 256, the active router moves all packets in the DSDB between the LastReconciledSequenceNumber and the last sequence number in the DSDB to beyond the current sequence number. A similar renumbering occurs in the XSDB, as a side-effect of moving the packets in the DSDB. Also, the current sequence number is advanced as each packet is moved in the DSDB and the XSDB. Note that it is necessary to move the packets even with sequence number greater than the mate's current sequence number, in order to preserve the order between namespace packets and subscription packets.

Alternatively, at step 256, an implementation may choose to simply remove all packets from the DSDB between LastReconciledSequenceNumber and the last sequence number in the DSDB, and place those packets on the temporary backup packet list.

At step 257, the active router removes entries from the temporary backup packet list. It places them at the end of the DSDB if they are not already present, or deletes them if they are duplicates of packets already in the DSDB (duplicates will occur if the same subscription is entered on both the primary and the backup routers while the network is partitioned). It also creates entries in the XSDB as needed. Current sequence number is advanced as entries are added.

As step 258, the newly synchronized DSDB is propagated to the standby router, and the newly synchronized XSDB is flooded into the network. For the DSDB this consists of propagating the sequence lists from the beginning of the DSDB to LastReconciledSequenceNumber, and propagating the actual packets from beyond LastRenconciledSequenceNumber to current sequence number. For the XSDB, this consists of propagating the sequence lists from the beginning of the XSDB to the last XSDB sequence number propagated before the reconcile started, and propagating the actual packets from that point to the end of the XSDB. Finally, step 259 is reached and the process is completed.

Whenever the database of a router is reset, a unique key is generated for the XSMP. This key is carried in the XSDB and DSDB row descriptions of the XSDD message as described above.

A key mismatch in a DSDB row between an active-active pair implies that sequence numbers may be overlapping, and the subscription set must be merged. In this situation of a mismatched key, this is accomplished by setting LastReconciledSequenceNumber to zero before invoking the procedure of FIG. 14 (described above).

If a router receives a key for a XSDB row that does not match the key that it previously received for the row, then it must delete any packets it had for that row, and then resynchronize by requesting the complete set of XSDB packets for that row.

VRRP 78 is adapted to work in concert with the redundancy scheme described above. The advertisement_interval of VRRP is preferably reduced from 1 second to 0.5 seconds to allow detection of a mate router failure in 1.5 seconds (three times the advertisement interval). As discussed above, because XML routers forward messages based on XML content, the content router, when in VRRP "master" state, must accept XSMP messages addressed to the XVRID, and must accept messages (e.g. XML messages) addressed to the XVRID, even if the router is not the IP address owner. Additionally, since no content router will have a physical interface associated with the XVRID, a router in master state must accept and respond to ICMP echo-requests ("ping" commands) addressed to the XVRID. The content router could also accept other packets addressed to the XVRID, such as XLSP messages, SSH packets, SNMP packets, SFTP packets, etc., but in practice, it is preferable that the content router not accept such messages when they are addressed to the XVRID, as users of such services generally will want to connect to a specific physical router. The master/standby status of each of the XVRIDs, as determined by VRRP, must be propagated to the redundancy FSMs of FIGS. 7 and 9 as described above. As an option, to avoid contention with IP routers on the same layer 2 segment that may also be using VRRP, the content-routers can choose to use a different MAC address and a different IP multicast address than those used by the IP routers running VRRP. This is only needed if overlapping independent VRRP VRIDs are desired between the content-routers and the IP routers.

When a content router gives up activity for an XVRID 106 or 116, it must close any TCP connections that had been established to the publishers and subscribers associated with that XVRID. The connections are preferentially closed with a TCP FIN segment so the other party knows quickly that the connection is closing. In addition, no further data should be accepted and processed on these connections and no new connections to this XVRID are to be accepted.

As disclosed in Ser. No. 11/012,113, the content routing techniques of XSMP and XLSP can be achieved by extensions to routing protocols such as OSPF, IS-IS and BGP. Similarly, the techniques of redundancy for content routers described above can be used with any of the routing techniques disclosed in Ser. No. 11/012,113, using similar extensions.

Figure 15:
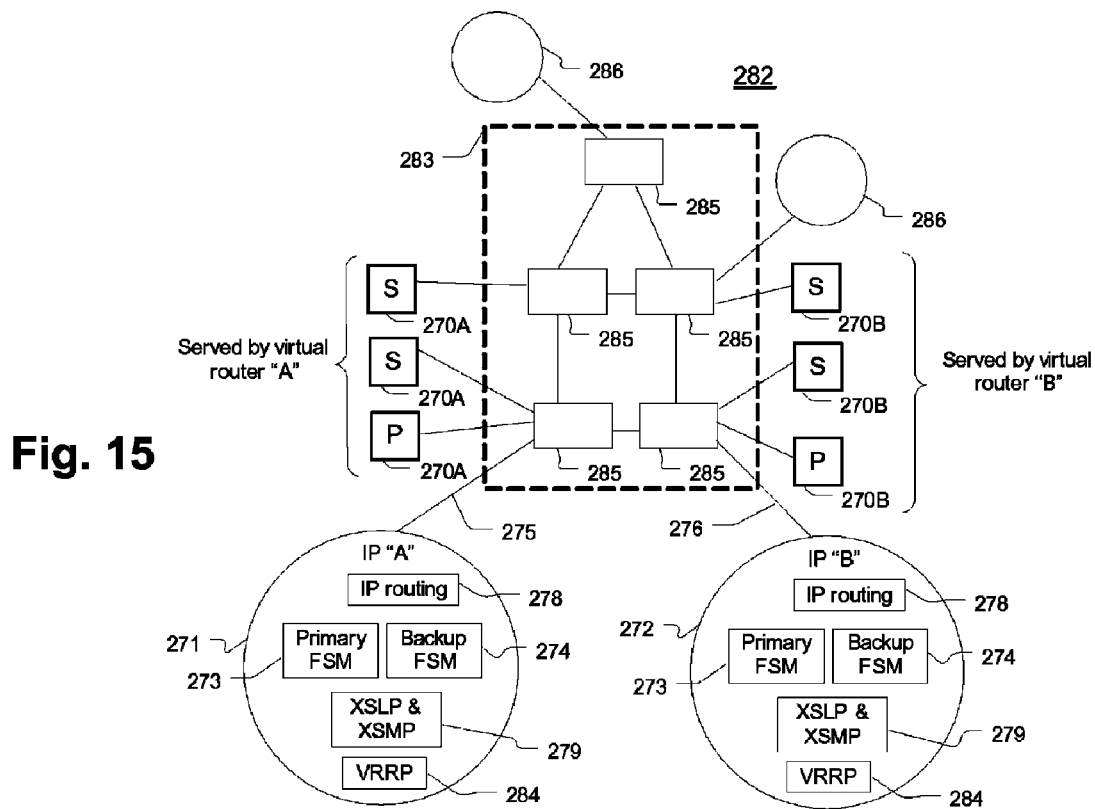
FIG. 15 shows operation of active-active redundancy without Layer 2 connectivity.

The active-active router redundancy scheme of this invention can also be adapted to operate without the need for layer 2 connectivity between content routers, as shown in FIG. 15. Content-routed network 282 is constructed as an overlay on an IP-routed network 283. IP network 283 consists of a plurality of IP routers 285. Content router 271 and content router 272 are configured to act as an active-active router pair. Content router 271 connects to IP network 283 over link 275. Content router 272 connects to IP network 283 over link 276. Note that a content router can optionally be multi-homed (not shown) into the IP network 283. Network 282 also consists of a plurality of other content routers 286. There is no layer 2 connectivity between content routers 271 and 272, i.e. these routers do not have interfaces to a common layer 2 network as in FIG. 4. Router 271 is the owner of the XVRID identified by IP "A", while router 272 is the owner of the XVRID identified by IP "B". Subscribers and publishers 270A are served by the virtual router "A" and connect to the router which is currently active for IP "A". Subscribers and publishers 270B are served by the virtual router "B" and connect to the router which is currently active for IP "B". Each of the routers 271 and 272 (and any other content router 286) contain XLSP and XSMP block 279, primary FSM block 273, backup FSM block 274, and VRRP block 284 as described earlier for FIG. 4. Additionally, there is IP routing block 278.

The VRRP block 284 is adapted form the standard VRRP specification (RFC 3768) without the need for a layer 2 multicast network. The VRRP messages sent between routers 271 and 272 are adapted to be addressed to the unicast IP address of the other router (using an address that specifies the physical router, and NOT the address IP "A" or IP "B", control of which moves dynamically between the two routers). In this way, the adapted VRRP protocol continues to be used to detect the presence of the mate router and to elect which router is active for each VRRP VRID. The VRRP communication flows between router 271 and 272 are via IP network 283.

Note that VRRP block 284 does not need to use the VRRP protocol at all but can use any protocol between router 271 and 272 which allows the two routers to elect which router is active for each XVRID.

Note that in FIG. 15, the content routers 271, 272 and 286, and subscribers and publishers 270A and 270B do not have to connect directly to the IP routers 285 of IP network 283, but may connect via layer 2 equipment, such as Layer 2 switches, as is known in the art.

IP network 283 will run an internal IP routing protocol, such as OSPF or IS-IS, allowing network 283 to determine the network topology and the routing to various IP addresses and IP network prefixes. Content router 271 and content router 272 contain an IP routing block 278, which runs an IP routing protocol that is used to communicate routing information with IP network 283. Typical examples of such routing protocols used are E-BGP and RIP, although OSPF and IS-IS may also be used. IP routing block 278 is used by router 271 and router 272 to allow the current location of XVRID IP "A" and XVRID IP "B" to be advertised into IP network 283.

Router 271 normally supports IP "A", and advertises IP "A" over link 275 into IP network 283 using a routing protocol such as BGP, using techniques known in the art. Similarly, router 272 normally supports IP "B", and advertises IP "B" over link 276 into IP network 283 using a routing protocol such as BGP. This allows network 283 to route IP traffic to IP "A" and IP "B". For example, when a subscriber or publisher 270A sends an IP packet to IP "A", network 283 can determine that the packet must be routed over link 275 to router 271. Similarly, when a subscriber or publisher 270B sends an IP packet to IP "B", network 283 can determine that the packet must be routed over link 276 to router 272.

If router 271 fails, the modified VRRP block 284 running on router 272 will detect that router 271 is no longer sending out VRRP advertisements for the VRID that it is backing up, and it will become active for that VRRP VRID (and thus for XVRID of IP "A"). This will trigger the backup FSM 274 to determine that router 272 must become active for XVRID "A" as described above. Additionally, this will trigger XLSP 279 to advertise a new priority for XVRID IP "A" for router 272, so other content routers determine that router 272 is now active for XVRID IP "A" as described above.

The additional step required is to modify the routing tables in IP network 283 so that packets addressed to IP "A" are routed to router 272 over link 276 instead of being routed to router 271 over link 275.

The cost of the route to the XVRID of IP "A" and IP "B" injected over links 275 and 276 are indicative of the priority of routers 271 and 272 for those XVRIDs, with a lower metric indicating a higher priority (i.e. more favorable route), and a higher metric indicating a lower priority (i.e. a less favorable route). These external routes are imported into IP network 283 using well-known techniques. As an example, if network 283 is running the OSPF protocol, the external routes can be imported into OSPF and advertised using Link State Advertisement type 5 (Autonomous System external LSA). Preferentially, the "E" bit in the LSA is set to indicate a Type 2 external metric, which means that advertised metric is considered larger than any link state path within the IP network 283. In this way, the internal routing metric within network 283 to reach link 275 or link 276 will not influence the metric advertised by router 271 and router 272 to reach a given XVRID.

Table 2 above specified the priority used within VRRP 284 and XLSP 279 to advertise the priority for a VRID and an XVRID respectively. When advertising this information into IP network 283, an inverted numbering scheme must be used since with priority, a higher value indicates more preferred, while with routing metrics, a lower value indicate more preferred. Example metric values are indicated in Table 32 below. The primary FSM 273 described above is adapted to also advertise the metric of Table 32 into IP network 283 via IP routing block 278. Note that the metric values in Table 32 below are examples only, and other values can be used as long as the relative order is preserved.

TABLE 32

| Priority advertised by VRRP 284 and XLSP 279 for XVRID | IP Routing metric value advertised for XVRID |
| --- | --- |
| VrrpOwner | 1 |
| PrimaryAsssertActivity | 1 |
| BackupAssertActivity | 2 |
| PrimaryActive | 50 |
| Backup | 75 |
| PrimaryReconcile | 100 |
| BackupReconcile | 200 |
| ReleaseActivity | 255 |

As an example of operation, when router 271 is normally active for XVRID IP "A", it will advertise a metric of 50 for IP "A" over link 275, while the backup router 272 will advertise a metric of 75 for IP "A" over link 276. IP network 283 will route any traffic addressed to IP "A" over link 275 to router 271.

When router 271 fails and router 272 determines that, it will assert activity for XVRID IP "A" and will advertise a metric of 2 (due to BackupAssertActivity) over link 276. In this way, even though IP network 283 may not have yet determined that router 271 has failed (and thus still has the advertisement from router 271 for IP "A" with metric 50), the advertisement from router 272 with a lower metric will take precedence, and network 283 will begin to route traffic addressed to IP "A" over link 276 to router 272. After a timed duration, router 272 will re-advertise IP "A" with a metric of 75 ("Backup"). However, by this time network 283 will have realized that router 271 has failed and its advertisement for IP "A" will have been withdrawn. Note additionally that router 272, through routing information received over link 276 from network 283 can determine when the other router to IP "A"

has been withdrawn, and can wait for this event to raise its metric for IP "A" to "Backup". As explained above, if router 271 has in fact not failed, and sees router 272 attempt to take control of IP "A", it can advertise a metric of "PrimaryAssertActivity" to take back control of IP "A".

As an option, when a router wishes to indicate that it does not wish to be active for a given XVRID, instead of advertising a high metric for that XVRID, such as "BackupReleaseActivity", it can instead withdraw its advertisement for the XVRID completely.

Additionally, the techniques of redundancy for content routers described above can be used in conjunction with IP Virtual Private Networks (VPNs). In this case, an XVRID would be assigned to each VPN instance, and advertised to the IP network using a standard routing protocol such as BGP, OSPF, or RIP. Alternatively, an XVRID could be assigned to a single VPN designated as the backbone VPN, and redistributed to the other VPNs at the Provider-Edge router, using route redistribution functions already known in the art.

It will be appreciated that an exemplary embodiment of the invention has been described, and persons skilled in the art will appreciated that many variants are possible within the scope of the invention.

All references mentioned above are herein incorporated by reference.

We claim:

1. A method of providing router redundancy within a distributed network of content routers, wherein messages are routed within the distributed network based on content, comprising:
    organizing said content routers into one or more redundancy groups, each redundancy group containing a plurality of normally active routers;
    assigning a physical identifier to each said content router in said one or more redundancy groups;
    assigning a set of end users to each one of said one or more redundancy groups;
    organizing said set of end users into a plurality of subsets of end users;
    associating a virtual identifier with each subset of said set of end users;
    distributing subscription information throughout the distributed network using the virtual identifiers to identify said plurality of subsets of end users;
    in each redundancy group, assigned a set of end users, designating one of said normally active routers as a primary router for each said virtual identifier associated with a subset of end users;
    advertising among said distributed network of routers the physical identifier for the primary router associated with each said virtual identifier for each redundancy group;
    matching incoming messages at a particular content router in the network outside a particular redundancy group with end users associated with a particular virtual identifier within said particular redundancy group;
    determining at said particular content router outside said particular redundancy group the physical identifier of the primary router associated with said particular virtual identifier within said particular redundancy group based on information stored at said particular router outside said particular redundancy group; and
    forwarding messages destined for said particular virtual identifier to the primary router based on the physical identifier of the primary router; and
    in the event of failure of a particular primary router, assigning an alternate router in the redundancy group associated with said particular primary router to the virtual identifier previously associated with said particular primary router, wherein said alternate router is the primary router for the virtual identifier associated with a different subset of end users, whereby in addition to acting as the primary router for the virtual identifier associated with said different subset of end users, said alternate router acts as a backup router to take over the virtual identifier whose primary router is said particular primary router; and
    advertising among said distributed network of routers the physical address of said alternate router as the new physical address associated with the virtual identifier previously associated with said particular primary router; and
    wherein the content routers run a link state protocol to distribute link state information and a subscription management protocol to distribute said subscription information;
    wherein each content router forming part of a particular redundancy group includes a memory storing a primary router configuration and a mate router configuration; and
    wherein the primary router configuration contains subscription information about each end user that is served by that primary router and wherein the mate router configuration contains the subscription information about each end user that is served by another primary router, whereby when a particular virtual identifier is assigned to the alternate router in the event of failure of the corresponding primary router, the alternate router already knows the subscription information for the end users formerly served by the failed primary router so that when it receives incoming messages from said particular content router outside the particular redundancy group, said alternate router is able to distribute said messages to the appropriate end users based on said mate configuration information.

2. The method of claim 1, wherein each router advertises its physical identifier and one or more virtual identifiers to which it is assigned by virtue of its membership in a particular redundancy group and a priority indicator for that router becoming the router associated with each said virtual identifier, and wherein said other routers determine the router associated with each virtual identifier based on said priority indicator.

3. The method of claim 2, wherein said other routers determine the router associated with a particular virtual identifier by selecting the physical router with the highest priority.

4. The method of claim 1, further comprising propagating stateful subscription information between a primary router, and one or more other of said normally active routers to update said mate configuration information.

5. The method of claim 4, wherein, in the event of a planned or unplanned failure of a primary router, an alternate router forming part of the same redundancy group as said primary router has a complete and accurate view of the stateful subscription information from the active primary router and takes over responsibility for tasks assigned to the failed router in the event of said planned or unplanned failure.

6. The method of claim 4, wherein in the event of a network partition and subsequent rejoining of the network, and in the presence of subscription additions and/or deletions on one or more of the routers while the network was partitioned, the stateful subscription information is reconciled between the primary and the alternate routers of a redundancy group.

7. The method of claim 1, wherein the routers of a redundancy group with work in concert with virtual private networks.

8. The method of claim 7, wherein the selection of an alternate router within a redundancy group is carried out using Virtual Router Redundancy Protocol (VRRP).

9. The method of claim 1, wherein the selection of an alternate router within a redundancy group is carried out using layer 2 connectivity between said routers.

10. The method of claim 1, wherein the routers are connected via an IP network, and IP routing protocol is used to effect a routing change for the virtual identifier.

11. The method of claim 1, wherein said subscription management protocol is XSMP and said link state protocol is XLSP, and wherein said XSMP and XLSP protocols are adapted to provide for router redundancy.

12. The method of claim 1, wherein said messages are XML based.

13. A method as claimed in claim 1, wherein direct links are established between routers of the same redundancy group to transfer link state and subscription management information.

14. A method as claimed in claim 1, wherein each router of a redundancy group includes a primary finite state machine determining whether or not that router should be for the primary router for the virtual identifier associated with the subset of subscribers associated with that router and a backup finite state machine to determine whether or not that router should be the alternate router associated with another subset of end users.

15. A distributed network of routers providing for router redundancy, wherein messages are routed within the distributed network based on content, comprising:
the routers of the distributed network organized into one or more redundancy groups, wherein a physical identifier is assigned to each said router in the one or more redundancy groups, each redundancy group of the one or more redundancy groups containing a plurality of normally active routers;
a set of end users assigned to at least one of said one or more redundancy groups, wherein said set of end users is organized into a plurality of subsets of end users, and wherein a virtual identifier is associated with each subset of said set of end users;
a subscription management protocol that distributes subscription information throughout the distributed network using the virtual identifiers to identify said subsets of end users;
wherein in each said one or more redundancy groups one of said normally active routers is designated as a primary router for each said virtual identifier associated with a subset of end users;
wherein said routers are configured to advertise to routers among said distributed network of routers for each of the one or more redundancy groups the physical identifier for the primary router associated with each said virtual identifier; and
wherein said routers, when acting as a particular router, are configured to:
match incoming messages at the particular router in the distributed network outside a particular redundancy group with end users associated with a particular virtual identifier within said particular redundancy group;
determine at said particular router outside said particular redundancy group the physical identifier of the primary router associated with said particular virtual identifier within said particular redundancy group based on information stored at said particular router outside said particular redundancy group;
forward messages destined for said particular virtual router identifier to the primary router based on the physical identifier of the primary router;
in the event of failure of a particular said primary router, assign an alternate router in the redundancy group associated with said particular primary router to the virtual identifier previously associated with said particular primary router, wherein said alternate router is the primary router for the virtual identifier associated with a different subset of end users, whereby in addition to acting as the primary router for the virtual identifier associated with said different subset of end users, said alternate router acts as a backup router to take over the virtual identifier whose primary router is said particular primary router; and
advertise among said distributed network of routers the physical address of said alternate router as the new physical address associated with the virtual identifier previously associated with said particular primary router; and
wherein the content routers are configured to run a link state protocol to distribute link state information and a subscription management protocol to distribute said subscription information;
wherein each router forming part of a particular redundancy group includes a memory storing a primary router configuration and a mate router configuration; and
wherein the primary router configuration contains subscription information about each end user that is served by that router and wherein the mate router configuration contains the subscription information about each end user that is served by another primary router, whereby when a particular virtual identifier is assigned to the alternate router in the event of failure of the corresponding primary router, the alternate router already knows the subscription information for the end users formerly served by the failed primary router so that when the alternate router receives incoming messages from said particular router outside the particular redundancy group, said alternate router is able to distribute said messages to the appropriate end users based on said mate configuration information.

16. The distributed network of claim 15,
wherein each router is configured to advertise its physical identifier, one or more virtual identifiers to which it is assigned by virtue of its membership in a particular redundancy group, and a priority indicator for that router becoming the active router associated with each said virtual identifier, and wherein other routers in the redundancy group are configured to determine the router associated with each virtual identifier based on said priority indicator.

17. The distributed network of claim 16, wherein said other routers are configured to determine the router associated with a particular virtual identifier by selecting the physical router with the highest priority.

18. The distributed network of claim 17, wherein said routers are configured to perform said advertising by broadcasting advertisements associated with each virtual identifier, said advertisements identifying the physical identifiers of the routers of the redundancy group to which that virtual identifier is assigned as well as providing information enabling other routers to determine the router associated with a particular virtual identifier.

19. The distributed network of claim 18, wherein said routers are configured to perform said advertising by broadcasting advertisements associated with each virtual identifier, said advertisements identifying the physical identifiers of the routers of the redundancy group to which that virtual identifier and said priority indicator enabling other routers to determine the router associated with a particular virtual identifier.

20. The distributed network of claim 15, wherein said routers are configured to propagate stateful subscription information between a primary router, and one or more other routers in a redundancy group to update said mate configuration information.

21. The distributed network of claim 20, which is configured such that in the event of a network partition and subsequent rejoining of the network, and in the presence of subscription additions and/or deletions on one or more of the routers while the network was partitioned, the stateful subscription information is reconciled between the primary and the alternate routers of a redundancy group, resulting in a consistent, complete, and identical subscription set in all of the routers of the redundancy group.

22. The distributed network of claim 15, wherein the routers of a redundancy group are configured to work in concert with virtual private networks.

23. The distributed network of claim 15, wherein the network is configured such that the selection of an alternate router within a redundancy group is carried out using Virtual Router Redundancy Protocol (VRRP).

24. The distributed network of claim 15, wherein the network is configured such that the selection of an alternate router within a redundancy group is carried out using layer 2 connectivity between said routers.

25. The distributed network of claim 15, wherein the network is configured such that the routers are connected via an IP network, and IP routing protocol is used to effect a routing change for the virtual identifier.

26. The distributed network of claim 15, wherein the network is XML based.

27. A distributed network of routers as claimed in claim 15, further comprising direct links established between routers of the same redundancy group to transfer link state and subscription management information.

28. A redundancy component as claimed in claim 27, wherein each router includes a primary finite state machine determining whether or not that router should be the primary router for the virtual identifier associated with the subset of subscribers associated with that router and a backup finite state machine to determine whether or not that router should be the alternate router for another subset of end users.

29. A distributed network of routers as claimed in claim 15, wherein each router of a redundancy group includes a primary finite state machine determining whether or not that router should be the primary router for the virtual identifier associated with the subset of subscribers associated with that router and a backup finite state machine to determine whether or not that router should be the alternate router associated with another subset of end users.

30. A redundancy component for a distributed network of routers wherein messages are routed within the network based on content, comprising:
  at least two normally active routers; and
  a physical identifier assigned to each said normally active router;
  a set of end users assigned to one or more redundancy groups; and wherein
  said set of end users is organized into a plurality of subsets of end users;
  wherein a virtual identifier is associated with each subset of said set of end users;
  wherein said normally active routers are configured to run a subscription management protocol to distribute subscription information throughout the network using the virtual identifiers to identify said plurality of subsets of end users;
  wherein in each said one or more redundancy groups one of said normally active routers is designated as a primary router for each said virtual identifier associated with a subset of end users;
  wherein said normally active routers are configured to advertise to routers among said distributed network of routers the physical identifier associated with each said virtual identifier; and
  wherein in the event of failure of a particular said primary router, an alternate router is associated with the virtual identifier previously associated with said particular primary router wherein said alternate router is the primary router for the virtual identifier associated with a different subset of end users, whereby in addition to acting as the primary router for the virtual identifier associated with said different subset of end users, said alternate router acts as a backup router to take over the virtual identifier whose primary router is said particular primary router; and
  wherein the physical address of said alternate router is advertised among said distributed network of routers as the new address associated with the virtual identifier previously associated with said particular primary router; and
  wherein the content routers are configured to run a link state protocol to distribute link state information and a subscription management protocol to distribute said subscription information;
  wherein each router forming part of a particular redundancy group includes a memory storing a primary router configuration and a mate router configuration; and
  wherein the primary router configuration contains subscription information about each end user that is served by that router and wherein the mate router configuration contains the subscription information about each end user that is served by another primary router, whereby when a particular virtual identifier is assigned to the alternate router in the event of failure of the corresponding primary router, the alternate router already knows the subscription information for the end users formerly served by the failed primary router so that when it receives incoming messages from said particular router outside the particular redundancy group, said alternate router is able to distribute said messages to the appropriate end users based on said mate configuration information.

31. A redundancy component as claimed in claim 30, further comprising direct links established between said routers to transfer link state and subscription management information.

* * * * *